US012319069B2

(12) United States Patent
Kyoso

(10) Patent No.: US 12,319,069 B2
(45) Date of Patent: Jun. 3, 2025

(54) LIQUID SUPPLY DEVICE, CONTROL METHOD OF LIQUID SUPPLY DEVICE, AND PRINTING APPARATUS

(71) Applicant: FUJIFILM Corporation, Tokyo (JP)

(72) Inventor: Tadashi Kyoso, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 184 days.

(21) Appl. No.: 18/311,885

(22) Filed: May 3, 2023

(65) Prior Publication Data

US 2023/0271426 A1 Aug. 31, 2023

Related U.S. Application Data

(63) Continuation of application No. PCT/JP2021/040721, filed on Nov. 5, 2021.

(30) Foreign Application Priority Data

Nov. 16, 2020 (JP) ................................ 2020-189984

(51) Int. Cl.
*B41J 2/18* (2006.01)
*B41J 2/175* (2006.01)

(52) U.S. Cl.
CPC ............. *B41J 2/18* (2013.01); *B41J 2/17596* (2013.01)

(58) Field of Classification Search
CPC ........... B41J 2/18; B41J 2/17596; B41J 2/175
See application file for complete search history.

(56) References Cited

U.S. PATENT DOCUMENTS

| | | | | |
|---|---|---|---|---|
| 6,231,174 | B1 | 5/2001 | Haigo | |
| 8,403,439 | B2 | 3/2013 | Tanaka et al. | |
| 8,506,029 | B2 | 8/2013 | Isozaki et al. | |
| 10,773,524 | B2 | 9/2020 | Mizuno | |
| 11,267,248 | B2 * | 3/2022 | Komatsu .................... | B41J 2/19 |

(Continued)

FOREIGN PATENT DOCUMENTS

| | | |
|---|---|---|
| JP | 3846083 | 11/2006 |
| JP | 2008238750 | 10/2008 |

(Continued)

OTHER PUBLICATIONS

"Search Report of Europe Counterpart Application", issued on Mar. 18, 2024, p. 1-p. 9.

(Continued)

*Primary Examiner* — An H Do
(74) *Attorney, Agent, or Firm* — JCIPRNET

(57) ABSTRACT

A sequence that includes first processing of generating a positive flow in a first direction in a liquid in a first flow passage including at least a part of a circulation flow passage through which the liquid is supplied from a liquid tank to the liquid jetting head and the liquid is collected from the liquid jetting head to the liquid tank and second processing of generating a negative flow in an opposite direction to the first direction in the liquid in the first flow passage, is executed. In the first flow passage, a filter that removes a foreign substance in the liquid is disposed between the liquid tank and the liquid jetting head in the positive flow. A flow rate of the liquid of the positive flow is higher than a flow rate of the liquid of the negative flow. The negative flow has a steady flow state.

14 Claims, 16 Drawing Sheets

(56) References Cited

U.S. PATENT DOCUMENTS

| | | | |
|---|---|---|---|
| 2011/0254903 | A1 | 10/2011 | Kanome et al. |
| 2012/0050357 | A1 | 3/2012 | Rasmussen |
| 2012/0224007 | A1 | 9/2012 | Koike et al. |
| 2014/0292952 | A1 | 10/2014 | Uchiyama |

FOREIGN PATENT DOCUMENTS

| | | |
|---|---|---|
| JP | 2014111334 | 6/2014 |
| JP | 2014188926 | 10/2014 |
| JP | 6111658 | 4/2017 |
| WO | 2011132256 | 10/2011 |

OTHER PUBLICATIONS

"International Search Report (Form PCT/ISA/210) of PCT/JP2021/040721", mailed on Jan. 25, 2022, with English translation thereof, pp. 1-5.

"Written Opinion of the International Searching Authority (Form PCT/ISA/237) of PCT/JP2021/040721", mailed on Jan. 25, 2022, with English translation thereof, pp. 1-10.

* cited by examiner

LIQUID SUPPLY DEVICE, CONTROL METHOD OF LIQUID SUPPLY DEVICE, AND PRINTING APPARATUS

CROSS-REFERENCE TO RELATED APPLICATIONS

The present application is a Continuation of PCT International Application No. PCT/JP2021/040721 filed on Nov. 5, 2021 claiming priority under 35 U.S.C § 119(a) to Japanese Patent Application No. 2020-189984 filed on Nov. 16, 2020. Each of the above applications is hereby expressly incorporated by reference, in its entirety, into the present application.

BACKGROUND OF THE INVENTION

1. Field of the Invention

The present invention relates to a liquid supply device, a control method of a liquid supply device, and a printing apparatus and particularly relates to a technique of preventing sedimentation of contents of a liquid in a flow passage.

2. Description of the Related Art

In an ink jet recording device, it is important to stabilize jetting of an ink from a recording head. In order to stabilize the jetting of the ink, an ink jet recording device that circulates the ink through a circulation flow passage provided between an ink tank and the recording head and that prevents removal of foreign substances and sedimentation of pigments is known.

Further, a technique of performing maintenance by changing a flowing direction of an ink in a circulation flow passage to a reverse direction is known. For example, JP6111658B and JP3846083B describe techniques of changing the flowing direction of the ink by changing a rotation direction of a pump to the reverse direction.

SUMMARY OF THE INVENTION

However, JP6111658B and JP3846083B are techniques of removing air bubbles in the circulation flow passage and cannot prevent sedimentation of pigments in an ink. In addition, in a case where the ink flows in the reverse direction without consideration, there is a problem of a possibility in which the contaminated ink adversely affects jetting.

In view of such circumstances, an object of the present invention is to provide a liquid supply device, a control method of a liquid supply device, and a printing apparatus that effectively prevent sedimentation without a contaminated liquid adversely affecting jetting.

According to an aspect for achieving the object, there is provided a liquid supply device comprising a circulation flow passage through which a liquid is supplied from a liquid tank storing the liquid to a liquid jetting head and the liquid is collected from the liquid jetting head to the liquid tank, a pump that is provided at the circulation flow passage and that generates a flow in the liquid in the circulation flow passage, a memory that stores a command which is executed by a processor, and the processor that is configured to execute the command stored in the memory, in which the processor is configured to execute, by controlling the pump, a sequence that includes first processing of generating a positive flow in a first direction in the liquid in a first flow passage including at least a part of the circulation flow passage and second processing of generating a negative flow in an opposite direction to the first direction in the liquid in the first flow passage, in the first flow passage, a filter that removes a foreign substance in the liquid is disposed between the liquid tank and the liquid jetting head in the positive flow, a flow rate of the liquid of the positive flow is higher than a flow rate of the liquid of the negative flow, and the negative flow has a steady flow state.

According to the present aspect, the sequence including the first processing of generating the positive flow in the liquid in the first flow passage and the second processing of generating the negative flow is executed, in the first flow passage, the filter that removes the foreign substance in the liquid is disposed between the liquid tank and the liquid jetting head in the positive flow, the flow rate of the liquid of the positive flow is higher than the flow rate of the liquid of the negative flow, and the negative flow has the steady flow state. Thus, sedimentation can be effectively prevented without the contaminated liquid adversely affecting jetting.

It is preferable that in the first flow passage, the filter that removes the foreign substance in the liquid is not disposed between the liquid tank and the liquid jetting head in the negative flow. Even in a case where the filter is not disposed between the liquid tank and the liquid jetting head in the negative flow, the present aspect is suitable.

It is preferable that the processor is configured to execute the sequence a plurality of times. By generating a negative flow a plurality of times, a total flow rate of negative flows can be acquired while suppressing further return of the contaminated liquid, and thereby sedimentation in the liquid can be more effectively prevented.

It is preferable that the first flow passage includes a second flow passage different from the circulation flow passage. By executing the sequence also on a flow passage in which the liquid does not circulate, sedimentation can be effectively prevented.

It is preferable that the flow rate of the liquid of the negative flow is lower than a volume of the second flow passage. Accordingly, the contaminated liquid in the second flow passage can be prevented from being diffused in the first flow passage by the negative flow.

It is preferable that the processor is configured to replace the liquid in the second flow passage with the liquid from which the foreign substance is removed by the filter by controlling the pump before executing the sequence. Accordingly, the contaminated liquid can be prevented from being diffused in the first flow passage by the negative flow.

It is preferable that the processor is configured to replace the liquid in all flow passages of the first flow passage, in which the liquid of the negative flow has flowed, with the liquid from which the foreign substance is removed by the filter by controlling the pump after executing the sequence. Accordingly, a normal operation can be started in an appropriate state.

According to another aspect for achieving the object, there is provided a printing apparatus comprising a liquid tank that stores a liquid, a liquid jetting head that jets the liquid from an outlet, a moving mechanism that relatively moves the liquid jetting head and a printing substrate, and the liquid supply device, in which the processor is configured to print an image on the printing substrate by jetting the liquid from the outlet of the liquid jetting head while relatively moving the liquid jetting head and the printing substrate, circulate the liquid in the circulation flow passage during the printing, and execute the sequence during non-printing other than during the printing.

According to the present aspect, the liquid can be supplied during printing, and sedimentation in the first flow passage can be prevented during non-printing.

It is preferable that a volume speed of the positive flow is at least temporarily higher than a volume speed during the printing. Accordingly, sedimentation in the first flow passage can be prevented by the positive flow.

It is preferable that a volume speed of the negative flow is at least temporarily higher than a volume speed during the printing. Accordingly, sedimentation in the first flow passage can be prevented by the negative flow.

It is preferable that a diameter of a particle dispersed in the liquid exceeds 100 nm. In a case of supplying the liquid in which sedimentation of the particle is easy, the present aspect is suitable.

It is preferable that the liquid is a white ink that contains a titanium oxide material. In a case of supplying the white ink containing the titanium oxide material, in which sedimentation of pigments is a problem, the present aspect is suitable.

It is preferable that the circulation flow passage comprises a valve that opens and closes some of flow passages of the circulation flow passage, and the processor is configured to control the valve to determine the first flow passage. Accordingly, a desired flow passage can be the first flow passage.

According to still another aspect for achieving the object, there is provided a control method of a liquid supply device including a circulation flow passage through which a liquid is supplied from a liquid tank storing the liquid to a liquid jetting head and the liquid is collected from the liquid jetting head to the liquid tank and a pump that is provided at the circulation flow passage and that generates a flow in the liquid in the circulation flow passage, the control method of a liquid supply device comprising executing, by controlling the pump, a sequence that includes first processing of generating a positive flow in a first direction in the liquid in the first flow passage including at least a part of the circulation flow passage and second processing of generating a negative flow in an opposite direction to the first direction in the liquid in the first flow passage, in which in the first flow passage, a filter that removes a foreign substance in the liquid is disposed between the liquid tank and the liquid jetting head in the positive flow, a flow rate of the liquid of the positive flow is higher than a flow rate of the liquid of the negative flow, and the negative flow has a steady flow state.

According to the present aspect, the sequence including the first processing of generating the positive flow in the liquid in the first flow passage and the second processing of generating the negative flow is executed, in the first flow passage, the filter that removes the foreign substance in the liquid is disposed between the liquid tank and the liquid jetting head in the positive flow, the flow rate of the liquid of the positive flow is higher than the flow rate of the liquid of the negative flow, and the negative flow has the steady flow state. Thus, sedimentation can be effectively prevented without the contaminated liquid adversely affecting jetting.

With the present invention, sedimentation can be effectively prevented without the contaminated liquid adversely affecting jetting.

DESCRIPTION OF THE PREFERRED EMBODIMENTS

Hereinafter, a preferable embodiment of the present invention will be described in detail with reference to the accompanying drawings.

[Overall Configuration of Ink Supply Device]

Figure 1:
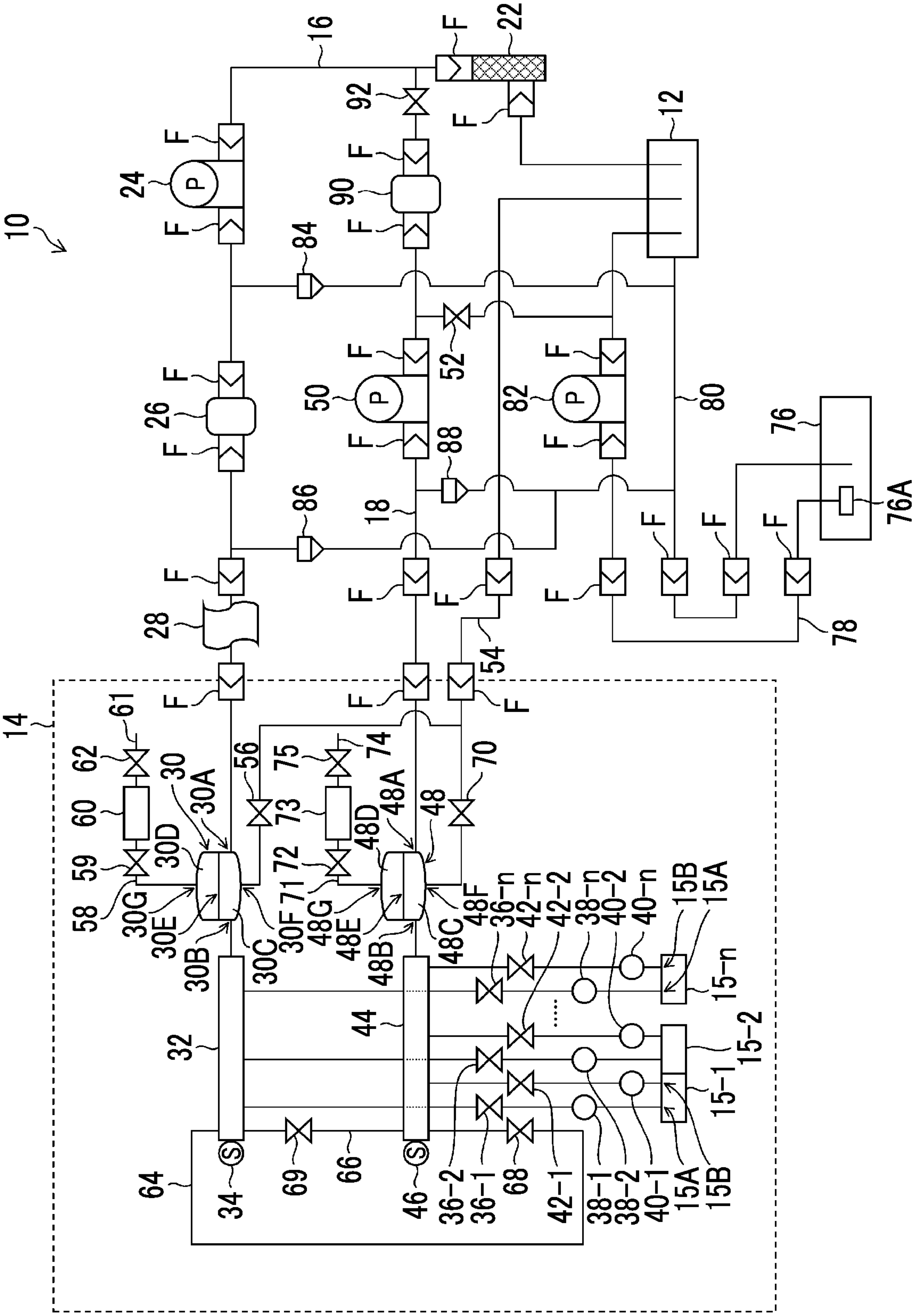
FIG. 1 is a diagram showing an overall configuration of an ink supply device.

FIG. 1 is a diagram showing an overall configuration of an ink supply device 10 (an example of a liquid supply device). The ink supply device 10 is a device that supplies an ink from a buffer tank 12 to an ink jet bar 14 and, as shown in FIG. 1, comprises a supply flow passage 16 and a collection flow passage 18.

The buffer tank 12 (an example of a liquid tank) is an ink storage unit that stores an ink (an example of a liquid) for being supplied to the ink jet bar 14.

The ink jet bar 14 (an example of a liquid jetting head) comprises n head modules 15 (15-1, 15-2, . . . , and 15-*n*) in which a plurality of nozzles 202 (see FIG. 17) for discharging inks respectively are provided. The n head modules 15 are connected to each other in one direction. Each of the head modules 15 has an ink supply port 15A and an ink discharge port 15B respectively.

The supply flow passage 16 makes the buffer tank 12 and the ink jet bar 14 communicate with each other. The collection flow passage 18 makes the ink jet bar 14 and the buffer tank 12 communicate with each other. An ink stored in the buffer tank 12 is supplied to the ink jet bar 14 via the supply flow passage 16. In addition, an ink not used in the ink jet bar 14 is collected in the buffer tank 12 via the collection flow passage 18.

The supply flow passage 16 and the collection flow passage 18 are composed of, for example, tubes. The supply flow passage 16 and the collection flow passage 18 are connected to each component as appropriate by a splice F.

A degassing module 22, a supply pump 24, a supply-side filter 26, and a heat exchanger 28 are provided at the supply flow passage 16. Inside the ink jet bar 14, a supply-side back pressure tank 30, a supply-side head manifold 32, a supply-side pressure sensor 34, supply valves 36 (36-1, 36-2, . . . , and 36-*n*), and supply dampers 38 (38-1, 38-2, . . . , and 38-*n*) are further provided at the supply flow passage 16.

In addition, a collection pump 50 and a collection flow passage valve 52 are provided at the collection flow passage 18. Inside the ink jet bar 14, collection dampers 40 (40-1, 40-2, . . . , and 40-*n*), collection valves 42 (42-1, 42-2, . . . , and 42-*n*), a collection-side head manifold 44, a collection-side pressure sensor 46, and a collection-side back pressure tank 48 are further provided at the collection flow passage 18.

The degassing module 22 performs ink degassing processing. The supply pump 24 applies a pressure to an ink inside the supply flow passage 16 and generates a flow in the ink inside the supply flow passage 16. The supply pump 24 is, for example, a tube pump. The supply-side filter 26 removes air bubbles and foreign substances in the ink. The heat exchanger 28 adjusts the temperature of the ink.

The supply-side back pressure tank 30 is a pressure buffering device that adjusts a pressure such that fluctuations in an internal pressure of the supply flow passage 16 are suppressed. The supply-side back pressure tank 30 has a liquid chamber 30C that communicates with the supply flow passage 16 via an ink inflow port 30A and an ink outflow port 30B, a gas chamber 30D that stores a gas, an elastic film 30E that separates the liquid chamber 30C and the gas chamber 30D from each other, an air bubble discharge port 30F that is provided in the liquid chamber 30C, and an air flow passage communication port 30G that is provided in the gas chamber 30D.

The ink inflow port 30A communicates with the heat exchanger 28. The ink outflow port 30B communicates with the supply-side head manifold 32. In a case where an ink flows from the ink inflow port 30A into the liquid chamber 30C, the elastic film 30E deforms to a gas chamber 30D side depending on the volume of the ink flowed in. Accordingly, the volume of the ink flowing out from the ink outflow port 30B does not fluctuate. Therefore, pressure fluctuations of the supply flow passage 16 can be suppressed. That is, the supply-side back pressure tank 30 has a pressure buffering function of suppressing internal pressure fluctuations of the ink jet bar 14 and fluctuations in the internal pressure of the supply flow passage 16 caused by a pulsating flow from an operation of the supply pump 24.

The air bubble discharge port 30F communicates with a drain flow passage 54. The drain flow passage 54 communicates with the air bubble discharge port 30F and the buffer tank 12. The drain flow passage 54 is a flow passage for forcibly discharging an ink in the liquid chamber 30C. The drain flow passage 54 is provided with a drain valve 56 that switches between communication (open state) and shutoff (closed state) between the air bubble discharge port 30F and the buffer tank 12. In a case where the drain valve 56 is in an open state, the ink in the liquid chamber 30C is fed to the buffer tank 12.

In addition, the supply-side back pressure tank 30 comprises, as gas elastic adjusting units for determining a pressure buffering performance of the supply-side back pressure tank 30, an air flow passage 58, an air connect valve 59, an air tank 60, an atmospheric communication path 61, and an air valve 62. The air flow passage communication port 30G communicates with the air flow passage 58. The air connect valve 59 is an air flow passage opening and closing unit that switches between communication and shutoff of the air flow passage 58, and the gas chamber 30D communicates with the air tank 60 via the air connect valve 59.

In addition, the atmospheric communication path 61 is provided with the air valve 62 that switches between communication and shutoff of the atmospheric communication path 61, and the air tank 60 communicates with the atmosphere via the atmospheric communication path 61.

A normally open type electromagnetic valve is used as the air connect valve 59. In addition, by applying a normally closed type electromagnetic valve to the air valve 62, a configuration where an ink does not leak from the ink jet bar 14 even in a case where a power supply is shut off in a state where an emergency stop function is activated or the like is adopted.

The gas chamber 30D communicates with the air tank 60 by opening the air connect valve 59, and the volume of the gas chamber 30D can be increased in response to pressure control of ink feeding. Further, by opening the air valve 62, the air tank 60 and the gas chamber 30D can communicate with the atmosphere. The air tank 60 functions as a buffer tank of the gas chamber 30D.

The supply-side head manifold 32 and the collection-side head manifold 44 are temporary storage units for an ink. A first bypass flow passage 64 and a second bypass flow passage 66 make the supply-side head manifold 32 and the collection-side head manifold 44 communicate with each other. The first bypass flow passage 64 is provided with a first bypass flow passage valve 68, and a second bypass flow passage valve 69 is provided with a second bypass flow passage 66.

The supply-side pressure sensor 34 is a pressure measuring unit that measures and outputs the internal pressure of the supply flow passage 16. In addition, the collection-side pressure sensor 46 is a pressure measuring unit that measures and outputs the internal pressure of the collection flow passage 18. Sensors such as a semiconductor piezo-resistance type sensor, a capacitance type sensor, and a silicon resonant type sensor can be applied to the supply-side pressure sensor 34 and the collection-side pressure sensor 46.

The head module 15 comprises the ink supply port 15A and the ink discharge port 15B. Each of the ink supply ports 15A of the head modules 15-1, 15-2, . . . , and 15-*n* communicates with the supply-side head manifold 32 via each of the supply valves 36-1, 36-2, . . . , and 36-*n*. In addition, each of the ink discharge ports 15B of the head modules 15-1, 15-2, . . . , and 15-*n* communicates with the collection-side head manifold 44 via each of the collection valves 42-1, 42-2, . . . , and 42-*n*.

The supply valves 36 (36-1, 36-2, . . . , and 36-*n*) are flow passage opening and closing units that switch between communication and shutoff of the supply flow passage 16.

The collection valves 42 (42-1, 42-2, . . . , and 42-*n*) are flow passage opening and closing units that switch between communication and shutoff of the collection flow passage 18. By applying a normally closed type (or a latch type) electromagnetic valve of which opening and closing are controlled by a control signal to the supply valves 36 and the collection valves 42, a configuration where an ink does not leak from the head modules 15 even in a case where the power supply is shut off in a state where the emergency stop function is activated or the like is adopted.

The supply dampers 38-1, 38-2, . . . , and 38-*n* are provided respectively between the supply valves 36-1, 36-2, . . . , and 36-*n* and the respective ink supply ports 15A. In addition, the collection dampers 40-1, 40-2, . . . , and 40-*n* are provided respectively between the collection valves 42-1, 42-2, . . . , and 42-*n* and the respective ink discharge ports 15B. Each of the supply dampers 38 and the collection dampers 40 is a pressure buffering unit for suppressing pulsation of an ink, which is caused by a jetting operation of the ink jet bar 14.

The collection-side back pressure tank 48 is a pressure buffering device that performs pressure adjustment such that fluctuations in the internal pressure of the collection flow passage 18 are suppressed and is configured the same as the supply-side back pressure tank 30.

That is, the collection-side back pressure tank 48 has a liquid chamber 48C that communicates the collection flow passage 18 via an ink inflow port 48A and an ink outflow port 48B, a gas chamber 48D that stores a gas, an elastic film 48E that separates the liquid chamber 48C and the gas chamber 48D from each other, an air bubble discharge port 48F that is provided in the liquid chamber 48C, and an air flow passage communication port 48G that is provided in the gas chamber 48D. The air bubble discharge port 48F communicates with the buffer tank 12 via the drain flow passage 54 provided with a drain valve 70. The air flow passage communication port 48G communicates with an atmospheric communication path 74 via an air flow passage 71, an air connect valve 72, an air tank 73, and an air valve 75.

The collection pump 50 applies a pressure to an ink inside the collection flow passage 18 and generates a flow in the ink inside the collection flow passage 18. The collection pump 50 is, for example, a tube pump. The collection flow passage valve 52 is a flow passage opening and closing unit that switches between communication and shutoff between the collection pump 50 and the buffer tank 12.

In addition, the ink supply device 10 comprises an ink main tank 76, a replenishment flow passage 78, an overflow flow passage 80, and a replenishment pump 82.

The ink main tank 76 is an ink storage unit that stores an ink for being supplied to the buffer tank 12. The replenishment flow passage 78 makes the ink main tank 76 and the buffer tank 12 communicate with each other. The overflow flow passage 80 makes the buffer tank 12 and the ink main tank 76 communicate with each other.

The replenishment pump 82 applies a pressure to an ink inside the replenishment flow passage 78 and generates a flow in the ink inside the replenishment flow passage 78. The replenishment pump 82 is, for example, a tube pump. By driving the replenishment pump 82, an ink is replenished from the ink main tank 76 to the buffer tank 12. The main tank filter 76A is provided at an end of the replenishment flow passage 78 on an ink main tank 76 side, and the buffer tank 12 is replenished with an ink from which foreign substances are removed by the main tank filter 76A. In addition, in a case of excessive replenishment, the ink returns from the buffer tank 12 to the ink main tank 76.

The ink supply device 10 further comprises a first safety valve 84, a second safety valve 86, a third safety valve 88, a collection-side filter 90, and a collection-side filter valve 92.

In a case where the internal pressure of the supply flow passage 16 rises above a predetermined value, the ink supply device 10 operates the first safety valve 84 and the second safety valve 86 to lower the internal pressure of the supply flow passage 16. In addition, in a case where the internal pressure of the collection flow passage 18 rises above a predetermined value, the ink supply device 10 operates the third safety valve 88 to lower the internal pressure of the collection flow passage 18.

The collection-side filter valve 92 is a flow passage opening and closing unit that switches between communication and shutoff between the collection pump 50 and the degassing module 22. By bringing the collection-side filter valve 92 into an open state, the ink supply device 10 can pass an ink, which has passed through the degassing module 22, through the collection-side filter 90.

Figure 2:
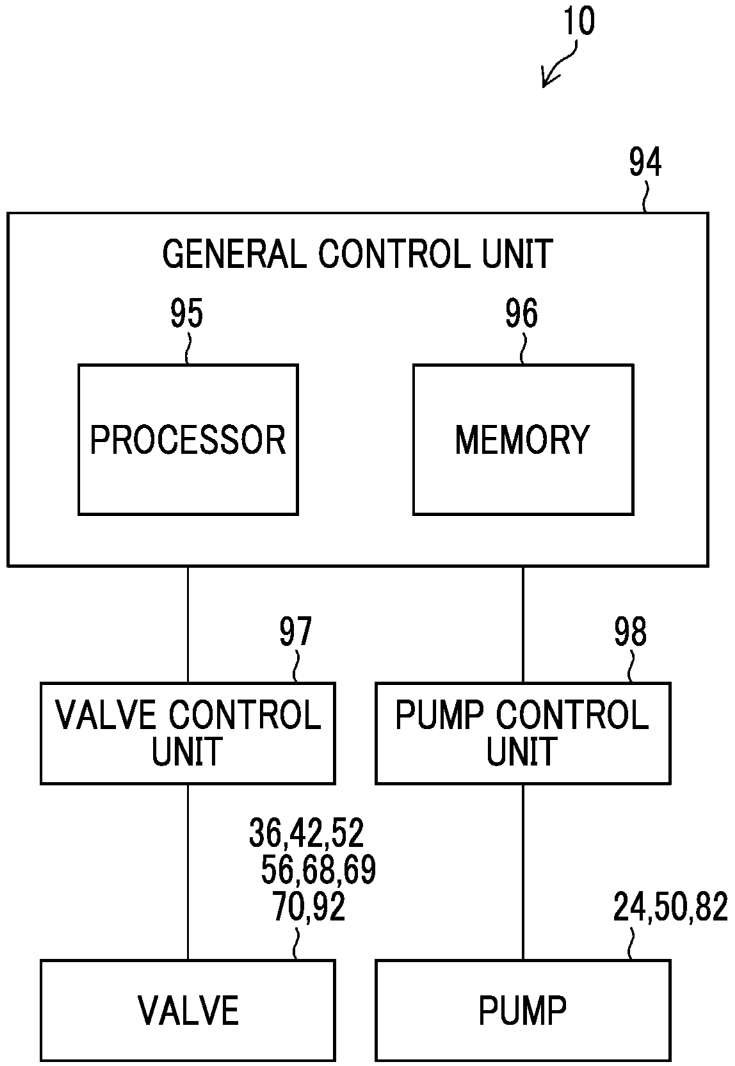
FIG. 2 is a block diagram showing a configuration of a control system of the ink supply device.

FIG. 2 is a block diagram showing a configuration of a control system of the ink supply device 10. As shown in FIG. 2, the ink supply device 10 comprises a general control unit 94, a valve control unit 97, and a pump control unit 98.

The general control unit 94 performs general control of an operation of the ink supply device 10 by controlling each of the valve control unit 97 and the pump control unit 98. The general control unit 94 comprises a processor 95 and a memory 96.

The processor 95 executes a command stored in the memory 96. A hardware structure of the processor 95 includes various types of processors described below. The various types of processors include a central processing unit (CPU) that is a general-purpose processor which executes software (program) and acts as various types of functional units, a graphics processing unit (GPU) that is a processor specialized in image processing, and a dedicated electric circuit or the like that is a processor having a dedicated circuit configuration designed to execute certain processing, such as a programmable logic device (PLD) and an application specific integrated circuit (ASIC) which are processors of which a circuit configuration can be changed after manufacturing a field programmable gate array (FPGA) or the like.

One processing unit may be configured by one of the various types of processors or may be configured by the same type or different types of two or more processors (for example, a plurality of FPGAs, a combination of a CPU and an FPGA, or a combination of a CPU and a GPU). In addition, one processor may configure a plurality of functional units. As an example of configuring a plurality of functional units by one processor, first, there is a form in which one processor is configured by a combination of one or more CPUs and software and the processor acts as the plurality of functional units, as represented by a computer such as a client and a server. Second, there is a form in which a processor that realizes functions of the entire system including a plurality of functional units with one integrated circuit (IC) chip is used, as represented by a system on chip (SoC) or the like. As described above, the various types of functional units are composed of one or more of the various types of processors used as a hardware structure.

Further, the hardware structure of the various types of processors is, more specifically, an electric circuit (circuitry) in which circuit elements such as semiconductor elements are combined.

The memory 96 stores a command to be executed by the processor 95. The memory 96 includes a random access memory (RAM) (not shown) and a read only memory (ROM) (not shown). The processor 95 uses the RAM as a work region, uses various types of programs including a control program of the ink supply device 10 stored in the ROM and parameters to execute software, and executes various types of processing of the ink supply device 10 by using the parameters stored in the ROM or the like.

The valve control unit 97 controls an open state and a closed state of each of the supply valves 36, the collection valves 42, the collection flow passage valve 52, the drain valve 56, the first bypass flow passage valve 68, the second bypass flow passage valve 69, the drain valve 70, and the collection-side filter valve 92. The valve control unit 97 may control an open state and an closed state of each of the air connect valve 59, the air valve 62, the air connect valve 72, and the air valve 75.

The pump control unit 98 controls an operation of each of the supply pump 24, the collection pump 50, and the replenishment pump 82.

Figure 3:
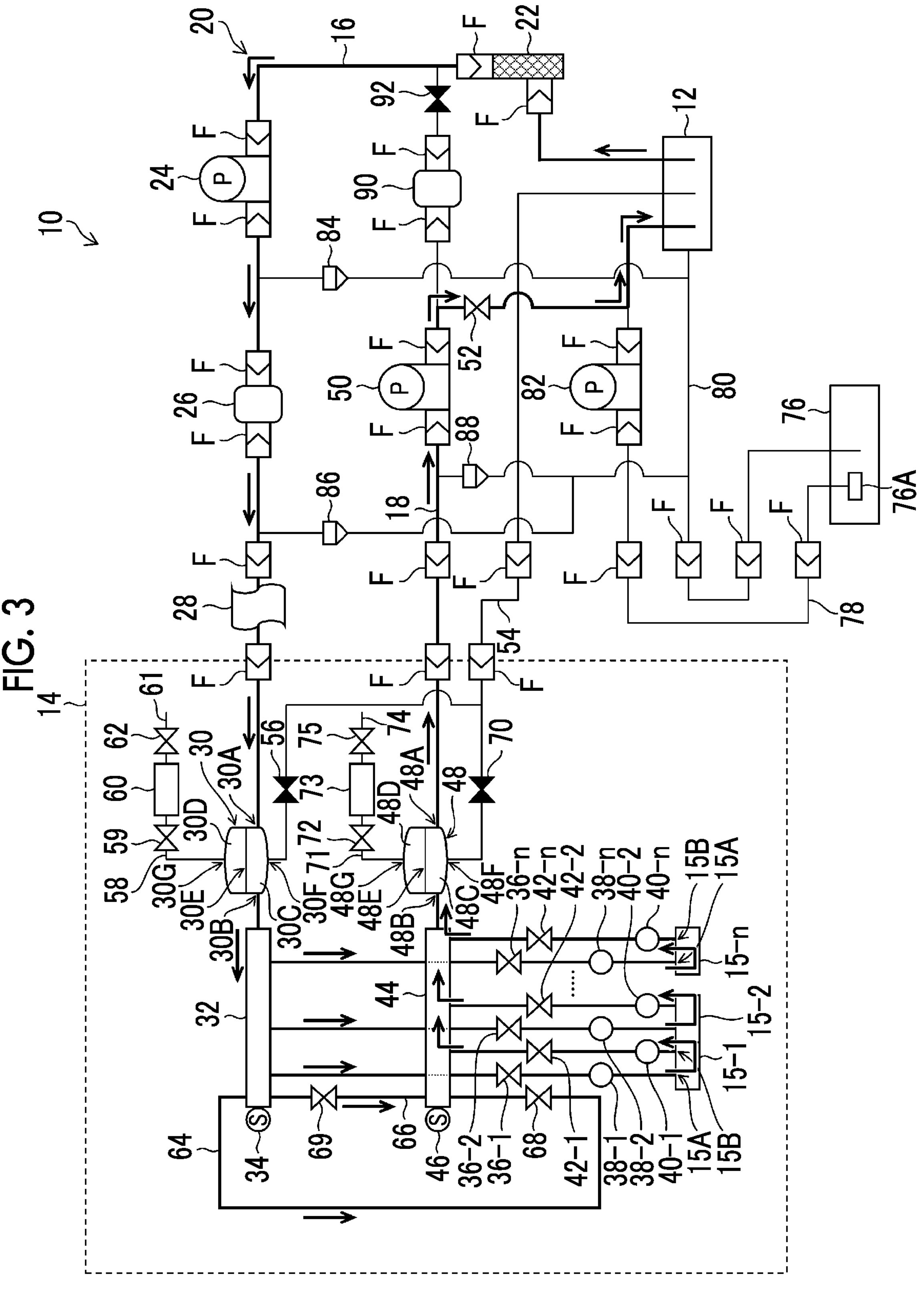
FIG. 3 is a diagram showing a flow of an ink in a case of a normal operation of the ink supply device.

FIG. 3 is a diagram showing a flow of an ink in a case of a normal operation of the ink supply device 10. As shown in FIG. 3, a circulation flow passage 20 in which an ink circulates in a case of the normal operation is composed of the supply flow passage 16 and the collection flow passage 18. That is, the circulation flow passage 20 is a flow passage that connects the buffer tank 12, the degassing module 22, the supply pump 24, the supply-side filter 26, the heat exchanger 28, the supply-side back pressure tank 30, the supply-side head manifold 32, the first bypass flow passage valve 68, the second bypass flow passage valve 69, the supply valves 36, the supply dampers 38, the head modules 15, the collection valves 42, the collection-side head manifold 44, the collection-side back pressure tank 48, the collection pump 50, the collection flow passage valve 52, and the buffer tank 12 to each other.

In FIG. 3, filled valves are shown to be in a closed state. That is, in a normal operation, the valve control unit 97 brings the drain valve 56, the drain valve 70, and the collection-side filter valve 92 into a closed state and brings the supply valves 36, the collection valves 42, the collection flow passage valve 52, the first bypass flow passage valve 68, and the second bypass flow passage valve 69 into an open state. In addition, in the normal operation, the pump control unit 98 rotates the supply pump 24 and the collection pump 50 in a positive direction. Accordingly, the ink supply device 10 circulates an ink between the buffer tank 12 and the ink jet bar 14 in the circulation flow passage 20 as shown by arrows of FIG. 3.

That is, an ink that has exited the buffer tank 12 first passes through the degassing module 22, and dissolved air in the ink is removed. The ink from which the dissolved air is removed and which has passed through the supply pump 24 passes through the supply-side filter 26, and foreign substances in the ink are removed. The ink from which the foreign substances are removed passes through the heat exchanger 28, and a temperature thereof is adjusted. As the ink of which the temperature is adjusted passes through the supply-side back pressure tank 30, fluctuations in the internal pressure of the supply flow passage 16 are suppressed. The ink which has passed through the supply-side back pressure tank 30 is supplied to the head modules 15 via the supply-side head manifold 32.

The ink supplied to the head modules 15 may be jetted from the nozzles 202 (see FIG. 17) as necessary. The ink which has not been jetted from the nozzles 202 is collected from the head modules 15 to the collection-side head manifold 44.

In addition, a part of the ink which has passed through the supply-side back pressure tank 30 is collected from the supply-side head manifold 32 to the collection-side head manifold 44 via the first bypass flow passage 64 and the second bypass flow passage 66.

As the ink collected in the collection-side head manifold 44 passes through the collection-side back pressure tank 48, fluctuations in the internal pressure of the collection flow passage 18 are suppressed. The ink which has passed through the collection-side back pressure tank 48 passes through the collection pump 50 and the collection flow passage valve 52 and returns to the buffer tank 12.

The ink stored in the buffer tank 12 of the ink supply device 10 is usually contaminated. This is because foreign substances can join an ink supplied from the ink main tank 76, and sedimentation of pigments occurs while being left inside the buffer tank 12 for a long period of time. As shown in FIG. 3, as the ink supply device 10 passes the ink through the supply-side filter 26 in a case of a normal operation, the contaminated ink can be prevented from spreading inside the circulation flow passage 20.

Although the tube pumps are applied as the supply pump 24 and the collection pump 50 in the present embodiment, other forms of pumps such as diaphragm pumps may be applied. The supply pump 24 and the collection pump 50 read measurement values of the supply-side pressure sensor 34 and the collection-side pressure sensor 46 respectively and control rotational speeds through PID control or the like such that the pressures become appropriate.

In addition, although an ink circulates to the inside of the head modules 15 in the flow passage in a case of a normal operation in the present embodiment, at least one of the supply valves 36 or the collection valves 42 may be brought into a closed state, and the ink may circulate through only the supply-side head manifold 32 and the collection-side head manifold 44. In addition, the ink may be intermittently circulated instead of being circulated at all times in a case of the normal operation.

First Embodiment

Figure 4:
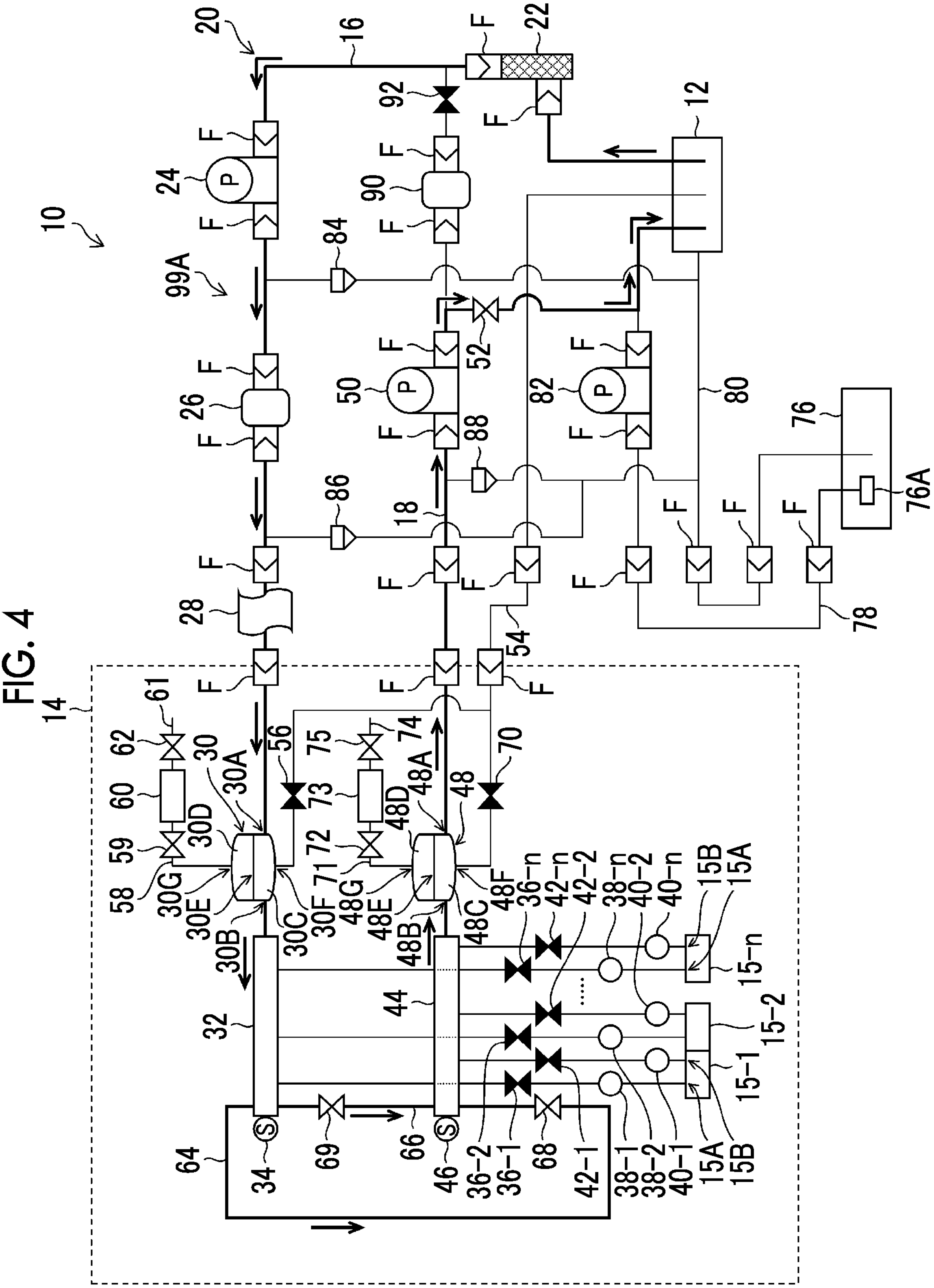
FIG. 4 is a diagram showing a flow of the ink in a maintenance operation according to a first embodiment of the ink supply device.
Figure 5:
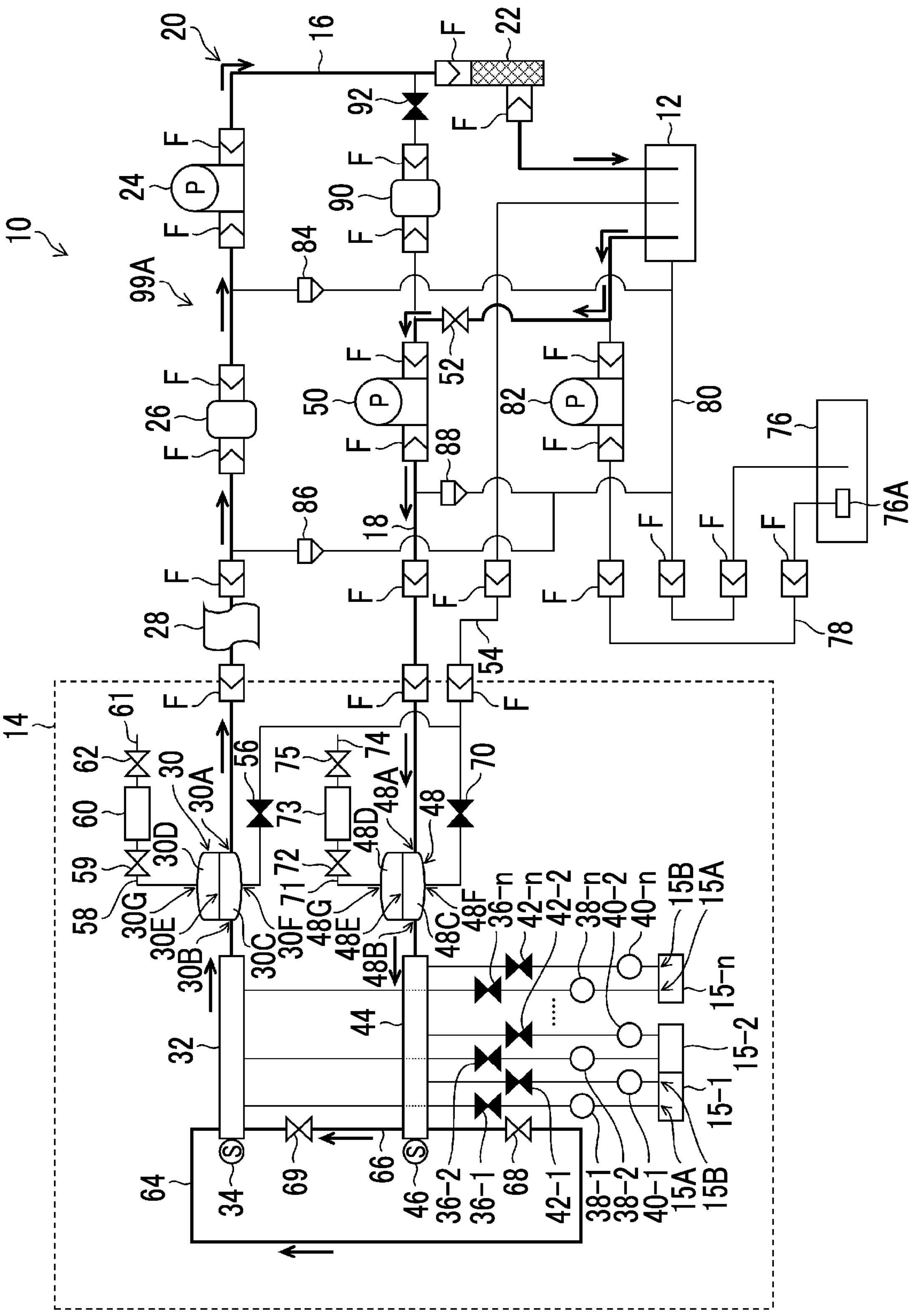
FIG. 5 is a diagram showing a flow of the ink in the maintenance operation according to the first embodiment of the ink supply device.

FIGS. 4 and 5 are diagrams showing a flow of an ink in a maintenance operation according to a first embodiment of the ink supply device 10.

At least in the maintenance operation, the ink supply device 10 executes agitating sequences including first processing of generating a positive flow in a first direction in an ink in an agitating flow passage 99A (an example of a first flow passage) including at least a part of the circulation flow passage 20 and second processing of generating a negative flow in an opposite direction to the first direction in the ink in the agitating flow passage 99A.

As shown in FIGS. 4 and 5, the agitating flow passage 99A is a flow passage that connects the buffer tank 12, the degassing module 22, the supply pump 24, the supply-side filter 26, the heat exchanger 28, the supply-side back pressure tank 30, the supply-side head manifold 32, the first bypass flow passage 64, the second bypass flow passage 66, the collection-side head manifold 44, the collection-side back pressure tank 48, the collection pump 50, the collection flow passage valve 52, and the buffer tank 12 to each other.

In FIGS. 4 and 5, filled valves are shown to be in a closed state. That is, in the maintenance operation, the valve control unit 97 brings the supply valves 36, the collection valves 42, the drain valve 56, the drain valve 70, and the collection-side filter valve 92 into a closed state and brings the collection flow passage valve 52, the first bypass flow passage valve 68, and the second bypass flow passage valve 69 into an open state.

As shown by arrows in FIG. 4, a positive flow of first processing is a flow in the first direction in which an ink in the buffer tank 12 returns to the buffer tank 12 via the degassing module 22, the supply pump 24, the supply-side filter 26, the heat exchanger 28, the supply-side back pressure tank 30, the supply-side head manifold 32, the first bypass flow passage 64, the second bypass flow passage 66, the collection-side head manifold 44, the collection-side back pressure tank 48, the collection pump 50, and the collection flow passage valve 52. In the agitating flow passage 99A, the supply-side filter 26 is disposed between the buffer tank 12 and the ink jet bar 14 in the positive flow. The pump control unit 98 rotates the supply pump 24 and the collection pump 50 in the positive direction in the first processing.

In a case where an ink volume speed of a positive flow is U1 and a flow time is T1, an ink volume (a flow rate of an ink of the positive flow) V1 flowing in a case of the positive flow can be expressed as V1=U1×T1. It is desirable that the positive flow is limited to circulation in the supply-side head manifold 32 and the collection-side head manifold 44 by bringing the supply valves 36 and the collection valves 42 into a closed state. Accordingly, a probability in which foreign substances generated by a flow of an ink that is different in a case of a normal operation flow into the head modules 15 can be reduced. In addition, even in a case where a positive flow is generated at a flow speed that is different in the case of the normal operation, it is easy to control nozzle menisci of the head modules 15 so that an appropriate pressure is maintained.

In addition, as shown by arrows in FIG. 5, a negative flow of second processing is a flow in the opposite direction to the first direction, in which an ink in the buffer tank 12 returns to the buffer tank 12 via the collection flow passage valve 52, the collection pump 50, the collection-side back pressure tank 48, the collection-side head manifold 44, the first bypass flow passage 64, the second bypass flow passage 66, the supply-side head manifold 32, the supply-side back pressure tank 30, the heat exchanger 28, the supply-side filter 26, the supply pump 24, and the degassing module 22. In the agitating flow passage 99A, a filter is not disposed between the buffer tank 12 and the ink jet bar 14 in the negative flow, that is, a filter is not disposed. The pump control unit 98 rotates the supply pump 24 and the collection pump 50 in a negative direction in the second processing.

In a case where an ink volume speed of a negative flow is U2 and a flow time is T2, an ink volume (a flow rate of an ink of the negative flow) V2 flowing in a case of the negative flow can be expressed as V2=U2×T2. It is desirable that even the negative flow is limited to circulation in the supply-side head manifold 32 and the collection-side head manifold 44 by bringing the supply valves 36 and the collection valves 42 into a closed state.

In a case where a negative flow of an ink is generated as shown in FIG. 5, an ink which has not passed through the supply-side filter 26 can flow into the inside of the ink jet bar 14. Accordingly, it is preferable that the ink volume V1 flowing in a case of a positive flow and the ink volume V2 flowing in a negative flow satisfy V1>V2 by the start of the next normal operation. That is, it is preferable that the flow rate of an ink of the positive flow of first processing is higher than the flow rate of an ink of the negative flow of second processing.

A positive flow and a negative flow can be realized by alternately switching between rotation directions of the tube pumps applied to the supply pump 24 and the collection pump 50. Since loads on the tube pumps are reduced and an ink flow has inertia, it is desirable to allow a waiting time of approximately one second before changing the direction of the ink flow. However, the waiting time depends on a flow passage design and a pump capacity. Thus, the waiting time cannot be generalized and thereby depends on design.

Figure 6:
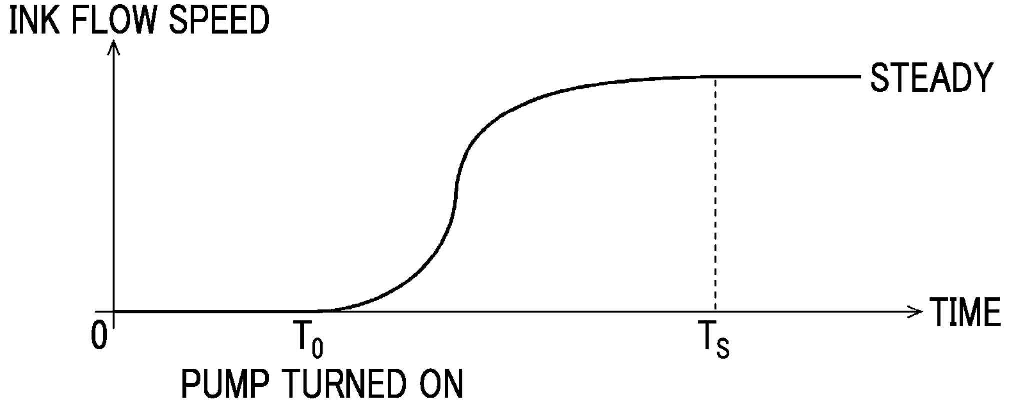
FIG. 6 is a graph showing time changes of an ink flow speed of a negative flow of a certain flow passage after driving a supply pump and a collection pump in a negative direction.
Figure 7:
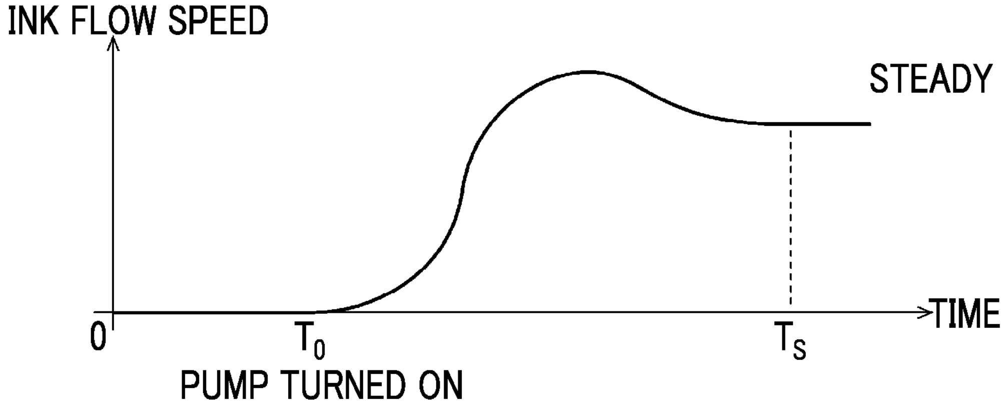
FIG. 7 is a graph showing time changes of the ink flow speed of the negative flow of a certain flow passage after driving the supply pump and the collection pump in the negative direction.

It is necessary for a negative flow to have a steady flow state for at least a certain period of time. Therefore, it is necessary to reliably secure the time T2 for generating the negative flow, that is equal to or longer than a time during which the negative flow becomes a steady flow. FIGS. 6 and 7 are graphs showing time changes of an ink flow speed of the negative flow of a certain flow passage after driving the supply pump 24 and the collection pump 50 in the negative direction. In FIGS. 6 and 7, the horizontal axis represents time, and the vertical axis represents the ink flow speed.

In the case shown in FIG. 6, the ink flow speed gradually increases from a timing $T_0$ when the driving of the supply pump 24 and the collection pump 50 has started and is the flow speed of a steady flow at the timing $T_S$. In this case, a time until the ink flow becomes a steady flow is $T_S-T_0$, and the time T2 for generating a negative flow is set to satisfy $T2>T_S-T_0$.

In the case shown in FIG. 7, the ink flow speed gradually increases from the timing $T_0$ when the driving of the supply pump 24 and the collection pump 50 has started, decreases thereafter, and becomes the flow speed of a steady flow at the timing $T_S$. In this case, a time until the ink flow becomes a steady flow is also $T_S-T_0$, and the time T2 for generating a negative flow is set to satisfy $T2>T_S-T_0$.

Depending on flow passage design, it takes several seconds or more for an ink to become a steady flow after pump driving in some cases. This is because an ink flow path system has a pressure loss component, an inertance component, and an acoustic capacitance component. In particular, only by driving the pump for a short period of time, an ink flow or a pressure attributable to a negative flow is not generated unlike expected in the tube separated from the pump, and moving foreign substances including pigment sediment, which is expected as an effect of the negative flow, is impossible. In the present embodiment, since the negative flow has a steady flow state for at least a certain period of time, pigment sediment and foreign substances can be effectively removed.

Figure 8:
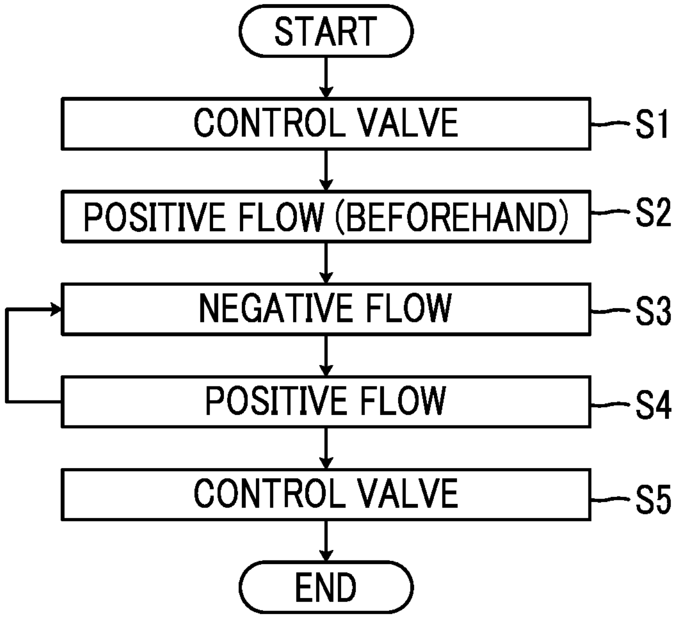
FIG. 8 is a flowchart showing processing of a control method in a case of the maintenance operation of the ink supply device.

FIG. 8 is a flowchart showing processing of a control method in a case of a maintenance operation of the ink supply device 10. The processor 95 reads out the control program of the ink supply device 10 from the memory 96 and executes the control program. The control program may be provided by being stored in a non-transitory storage medium or may be provided via a network (not shown).

In Step S1, the valve control unit 97 controls the supply valves 36, the collection valves 42, the collection flow passage valve 52, the drain valve 56, the first bypass flow passage valve 68, the second bypass flow passage valve 69, the drain valve 70, and the collection-side filter valve 92 and determines an ink flow passage.

Herein, as the valve control unit 97 brings the supply valves 36, the collection valves 42, the drain valve 56, the drain valve 70, and the collection-side filter valve 92 into a closed state and brings the collection flow passage valve 52, the first bypass flow passage valve 68, and the second bypass flow passage valve 69 into an open state, the agitating flow passage 99A shown in FIGS. 4 and 5 is generated.

Step S2 is processing of generating a positive flow in an ink inside the agitating flow passage 99A before performing agitating sequences. In Step S2, the pump control unit 98 controls the supply pump 24 and the collection pump 50 and generates a positive flow in the ink inside the agitating flow passage 99A. Herein, the pump control unit 98 rotates the supply pump 24 and the collection pump 50 in the positive direction and flows an ink having a volume larger than the volume of the circulation flow passage 20. As described above, it is preferable that the positive flow is generated before starting from a negative flow, which is second processing, and the ink inside the agitating flow passage 99A is replaced with an ink in a fresh state, which has passed through the supply-side filter 26.

In Step S3, the processor 95 executes second processing of the agitating sequences. That is, the pump control unit 98 controls the supply pump 24 and the collection pump 50 and generates a negative flow having a steady flow state in the ink inside the agitating flow passage 99A at least for a certain period of time. Herein, the pump control unit 98 rotates the supply pump 24 and the collection pump 50 in the negative direction and flows an ink having the ink volume V2 at the ink volume speed U2.

The ink volume speed U2 is faster than an ink volume speed U0 in a case of a normal operation. Accordingly, pigment sediment and foreign substances in the ink, which are difficult to be removed, can be effectively removed.

In Step S4, the processor 95 executes first processing of the agitating sequences. That is, the pump control unit 98 controls the supply pump 24 and the collection pump 50 and generates a positive flow in the ink inside the agitating flow passage 99A. Herein, the pump control unit 98 rotates the supply pump 24 and the collection pump 50 in the positive direction and flows an ink having the ink volume V1 at the ink volume speed U1. Herein, V1 is larger than V2. Accordingly, an ink in the ink jet bar 14 can be replaced with an ink in a fresh state, which has passed through the supply-side filter 26.

In addition, the ink volume speed U1 is faster than the ink volume speed U0 in a case of a normal operation. Accordingly, pigment sediment and foreign substances in the ink, which are difficult to be removed, can be effectively removed.

As described above, it is preferable that the processor 95 first executes agitating sequences by starting from a negative flow, which is second processing, and then executes a positive flow, which is first processing.

Although the processor 95 may perform agitating sequences only once, the processor 95 repeatedly executes second processing of Step S3 and first processing of Step S4 a plurality of times in the present embodiment.

As described above, by repeatedly generating a negative flow a plurality of times, a total flow rate of negative flows can be acquired while suppressing the return of a contaminated ink, and a measure against sedimentation of pigments in an ink becomes more effective. In addition, in a case where i and n are natural numbers and agitating sequences are repeated n times, it is preferable that $V1(i)>V2(i)$ is satisfied for each of i=1 to n, assuming that an ink volume of an ink flowing in a case of an ith positive flow is $V1(i)$ and an ink volume of an ink flowing in a case of an ith negative flow is $V2(i)$. The agitating sequences may include processing other than first processing and second processing, such as processing of switching between communication and shutoff of any valve and processing of stopping any pump. That is, the agitating sequences may include at least the first processing and the second processing.

After the agitating sequences end, by flowing, with a positive flow, an ink having a volume larger than the volume of the circulation flow passage 20, it is better to replace the ink inside the agitating flow passage 99A with an ink in a fresh state, which has passed through the supply-side filter 26.

Finally, in Step S5, the valve control unit 97 controls the supply valves 36, the collection valves 42, the collection flow passage valve 52, the drain valve 56, the first bypass flow passage valve 68, the second bypass flow passage valve 69, the drain valve 70, and the collection-side filter valve 92 and ends the processing of the present flowchart. Herein, the valve control unit 97 generates the circulation flow passage 20 in a case of the normal operation shown in FIG. 3 by bringing the drain valve 56, the drain valve 70, and the collection-side filter valve 92 into a closed state and bringing the supply valves 36, the collection valves 42, the collection flow passage valve 52, the first bypass flow passage valve 68, and the second bypass flow passage valve 69 into an open state. The pump control unit 98 may control the supply pump 24 and the collection pump 50 as necessary.

Sedimentation of pigments included in an ink in a flow passage can be prevented by executing agitating sequences as described above.

Second Embodiment

Figure 9:
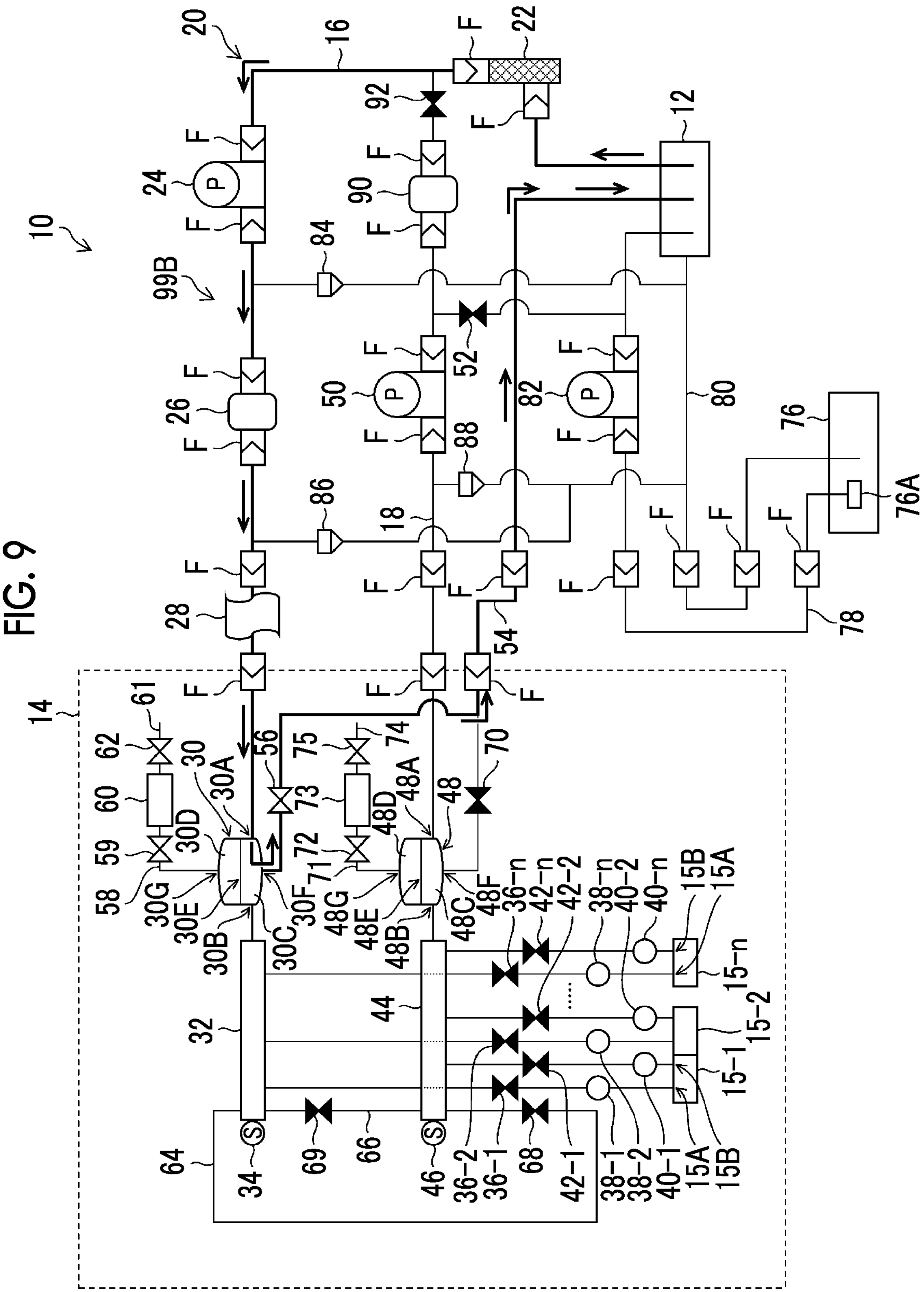
FIG. 9 is a diagram showing a flow of an ink in a maintenance operation according to a second embodiment of the ink supply device.
Figure 10:
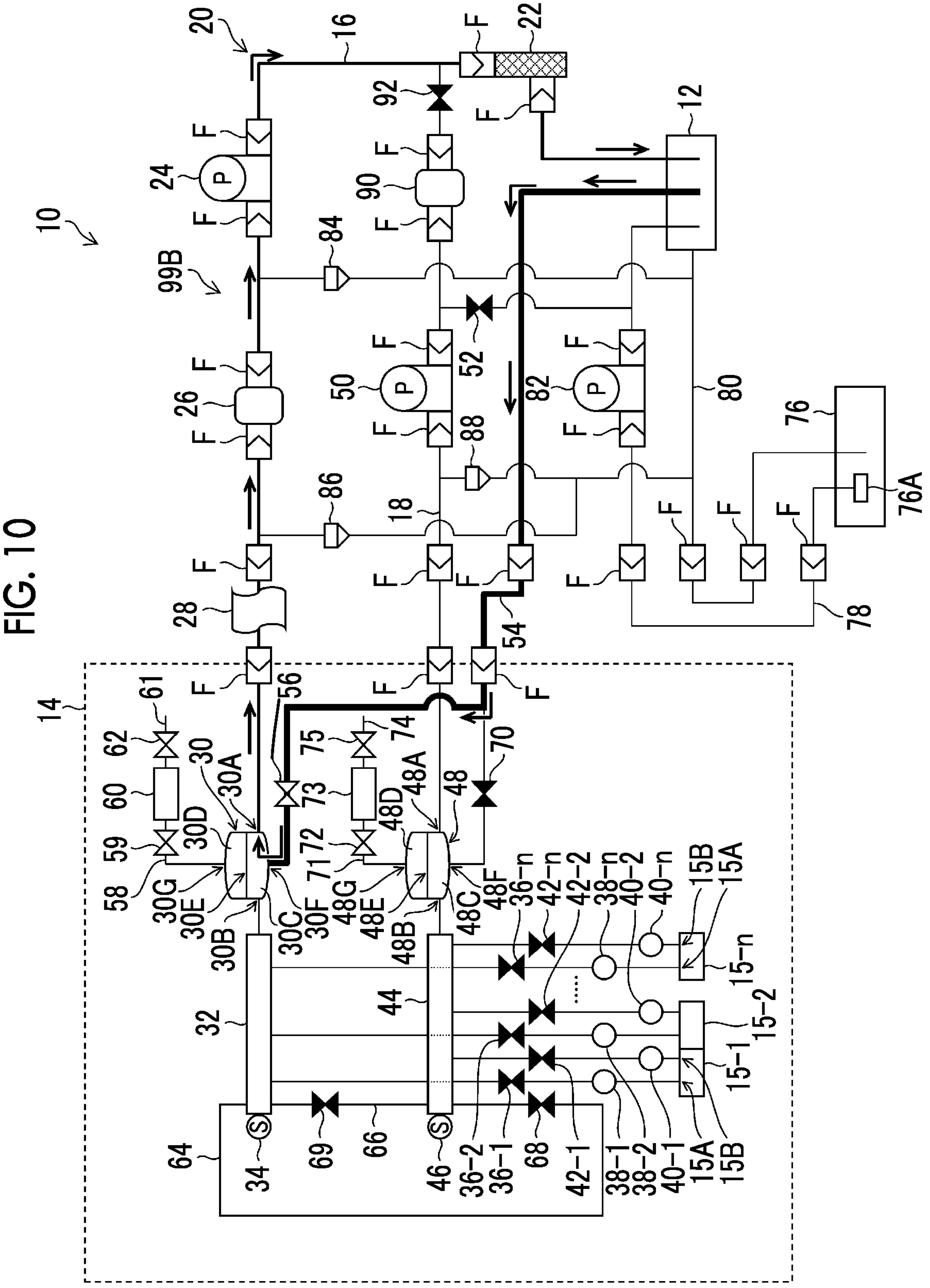
FIG. 10 is a diagram showing a flow of the ink in the maintenance operation according to the second embodiment of the ink supply device.

FIGS. 9 and 10 are diagrams showing a flow of an ink in a maintenance operation according to a second embodiment of the ink supply device 10. At least in the maintenance operation, the ink supply device 10 executes agitating sequences including first processing of generating a positive flow in an ink in an agitating flow passage 99B (an example of the first flow passage) including at least a part of the circulation flow passage 20 and second processing of generating a negative flow in the ink in the agitating flow passage 99B.

As shown in FIGS. 9 and 10, the agitating flow passage 99B is a flow passage that connects the buffer tank 12, the degassing module 22, the supply pump 24, the supply-side filter 26, the heat exchanger 28, the supply-side back pressure tank 30, the drain valve 56, and the buffer tank 12 to each other. As described above, the agitating flow passage 99B does not include the supply-side head manifold 32 and the collection-side head manifold 44. In addition, in the agitating flow passage 99B, the drain flow passage 54 (an example of a second flow passage) that is shown by a thick line in FIG. 10 and that connects the supply-side back pressure tank 30, the drain valve 56, and the buffer tank 12 to each other is a flow passage that is not used in a case of a normal operation.

In FIGS. 9 and 10, filled valves are shown to be in a closed state. That is, in a maintenance operation, the valve control unit 97 brings the supply valves 36, the collection valves 42, the collection flow passage valve 52, the first bypass flow passage valve 68, the second bypass flow passage valve 69, the drain valve 70, and the collection-side filter valve 92 into a closed state and brings the drain valve 56 into an open state.

As shown by arrows in FIG. 9, a positive flow of first processing is a flow in which an ink in the buffer tank 12 returns to the buffer tank 12 via the degassing module 22, the supply pump 24, the supply-side filter 26, the heat exchanger 28, the supply-side back pressure tank 30, and the drain valve 56. In the agitating flow passage 99B, the supply-side filter 26 is disposed between the buffer tank 12 and the ink jet bar 14 in the positive flow. In the first processing, the pump control unit 98 rotates the supply pump 24 in the positive direction and flows an ink having the ink volume V1 at the ink volume speed U1.

As shown by arrows in FIG. 10, a negative flow of second processing is a flow in which an ink in the buffer tank 12 returns to the buffer tank 12 via the drain valve 56, the supply-side back pressure tank 30, the heat exchanger 28, the supply-side filter 26, the supply pump 24, and the degassing module 22. In the agitating flow passage 99B, a filter is not disposed between the buffer tank 12 and the ink jet bar 14 in the negative flow. In the second processing, the pump control unit 98 rotates the supply pump 24 in the negative direction and flows an ink having the ink volume V2 at the ink volume speed U2. The negative flow has a steady flow state for at least a certain period of time.

As described above, in a negative flow, an ink which has not passed through the filter can be flowed into the inside of the ink jet bar 14. Therefore, as in the first embodiment, it is preferable that the ink volume V1 and the ink volume V2 satisfy a relationship of V1>V2. In addition, it is desirable that agitating sequences are executed not only once but a plurality of times. Further, it is preferable that the ink volume speed U1 and the ink volume speed U2 satisfy relationships of U1>U0 and U2>U0 with respect to the ink volume speed U0 in a case of a normal operation.

In addition, in agitating sequences, an ink flows in the drain flow passage 54 where the ink does not flow in a case of a normal operation. Since there is little opportunity in which the ink flows in the case of the normal operation, the drain flow passage 54 is in a state where sedimentation of pigments is easy, and the sedimentation of the pigments can be prevented by the agitating sequences.

Herein, it is desirable to replace the ink in the drain flow passage 54 that connects the supply-side back pressure tank 30 and the buffer tank 12 to each other with a fresh ink which has passed through the supply-side filter 26, before executing agitating sequences. For this reason, it is desirable that the positive flow shown in FIG. 9 is executed for a predetermined time.

In addition, in a case where the volume of the drain flow passage 54 that connects the supply-side back pressure tank 30 and the buffer tank 12 to each other is V3, it is desirable that the ink volume V2 of a negative flow is smaller than the volume V3 of the drain flow passage 54. Accordingly, a probability in which an ink which has not passed through the supply-side filter 26 flows in an inappropriate region, such as the inside of the ink jet bar 14, can be lowered.

Third Embodiment

Figure 11:
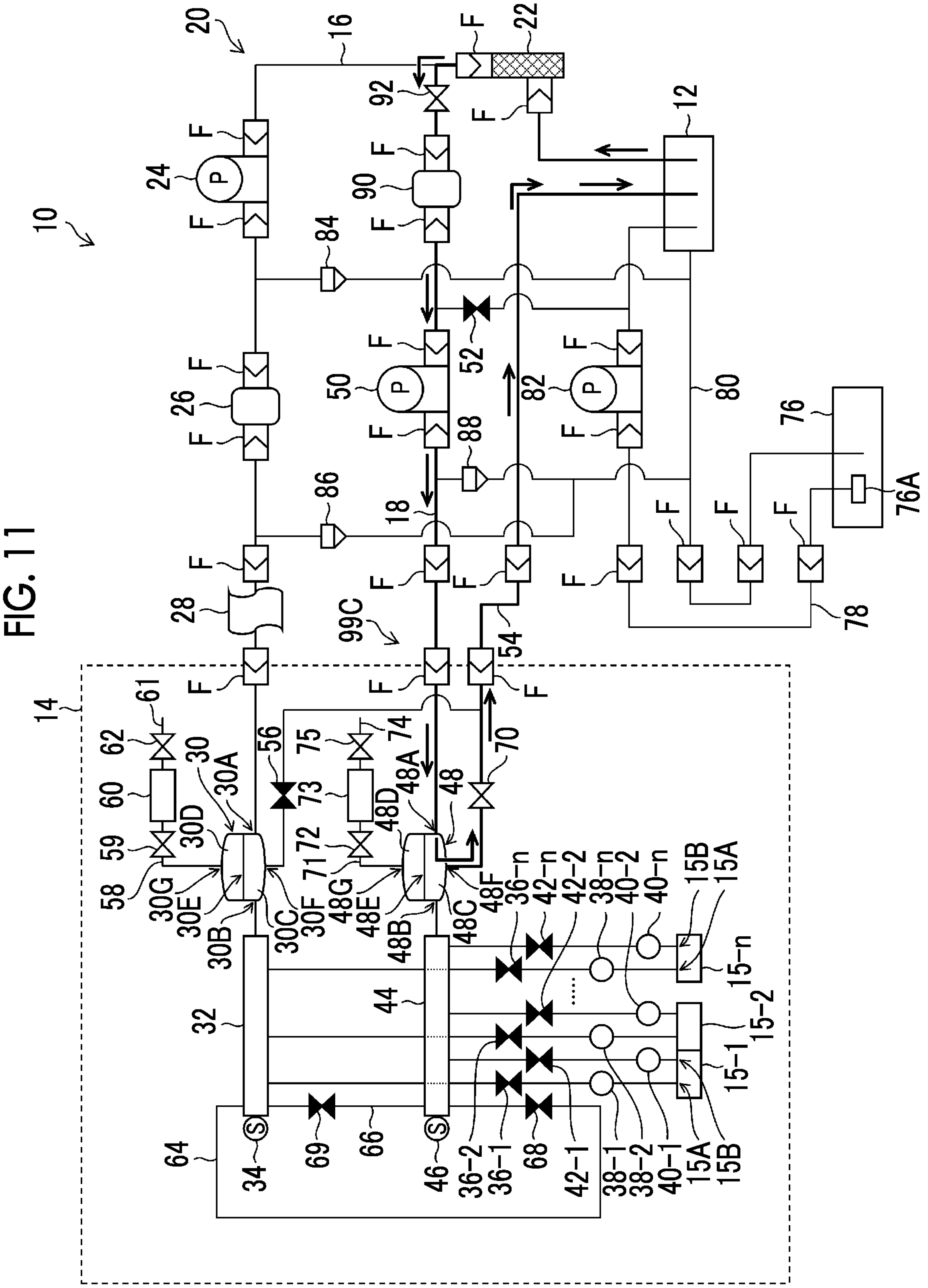
FIG. 11 is a diagram showing a flow of an ink in a maintenance operation according to a third embodiment of the ink supply device.
Figure 12:
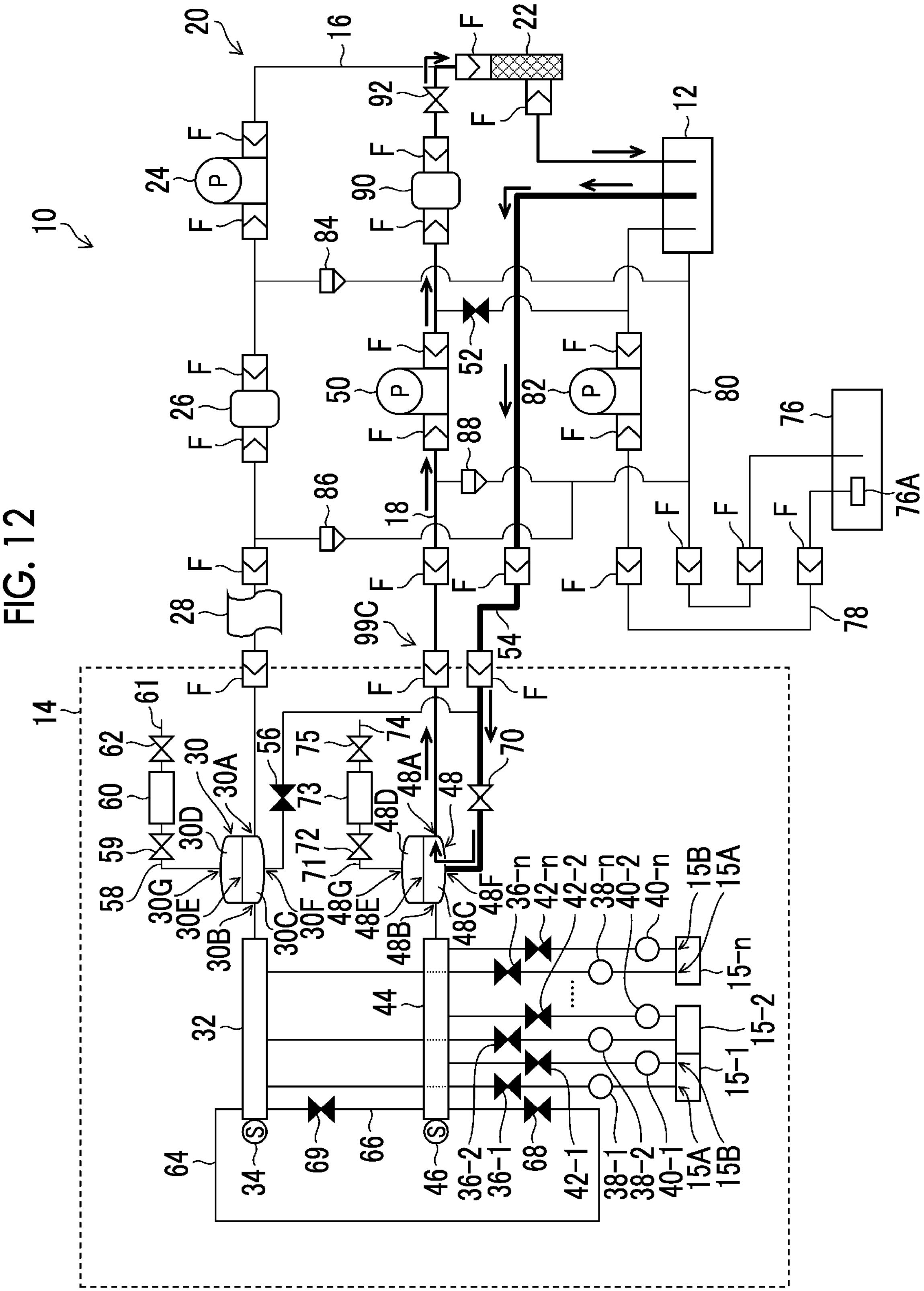
FIG. 12 is a diagram showing a flow of the ink in the maintenance operation according to the third embodiment of the ink supply device.

FIGS. 11 and 12 are diagrams showing a flow of an ink in a maintenance operation according to a third embodiment of the ink supply device 10. At least in the maintenance operation, the ink supply device 10 executes agitating sequences including first processing of generating a positive flow in an ink in an agitating flow passage 99C (an example of the first flow passage) including at least a part of the circulation flow passage 20 and second processing of generating a negative flow in the ink in the agitating flow passage 99C.

As shown in FIGS. 11 and 12, the agitating flow passage 99C is a flow passage that connects the buffer tank 12, the degassing module 22, the collection-side filter valve 92, the collection-side filter 90, the collection pump 50, the collection-side back pressure tank 48, the drain valve 70, and the buffer tank 12 to each other. As described above, the agitating flow passage 99C does not include the supply-side head manifold 32 and the collection-side head manifold 44. In addition, in the agitating flow passage 99C, the drain flow passage 54 (an example of the second flow passage) that is shown by a thick line in FIG. 12 and that connects the collection-side back pressure tank 48, the drain valve 70, and the buffer tank 12 to each other is a flow passage that is not used in a case of a normal operation.

In FIGS. 11 and 12, filled valves are shown to be in a closed state. That is, the valve control unit 97 brings the supply valves 36, the collection valves 42, the collection flow passage valve 52, the drain valve 56, the first bypass flow passage valve 68, and the second bypass flow passage valve 69 into a closed state and brings the drain valve 70 and the collection-side filter valve 92 into an open state.

As shown by arrows in FIG. 11, a positive flow of first processing is a flow in which an ink in the buffer tank 12 returns to the buffer tank 12 via the degassing module 22, the collection-side filter valve 92, the collection-side filter 90, the collection pump 50, the collection-side back pressure tank 48, and the drain valve 70. In the agitating flow passage 99C, the collection-side filter 90 is disposed between the buffer tank 12 and the ink jet bar 14 in the positive flow. In the first processing, the pump control unit 98 rotates the collection pump 50 in the negative direction and flows an ink having the ink volume V1 at the ink volume speed U1.

As shown by arrows in FIG. 12, a negative flow of second processing is a flow in which an ink in the buffer tank 12 returns to the buffer tank 12 via the drain valve 70, the collection-side back pressure tank 48, the collection pump 50, the collection-side filter 90, the collection-side filter valve 92, and the degassing module 22. In the agitating flow passage 99C, a filter is not disposed between the buffer tank 12 and the ink jet bar 14 in the negative flow. In the second processing, the pump control unit 98 rotates the collection pump 50 in the positive direction and flows an ink having the ink volume V2 at the ink volume speed U2. The negative flow has a steady flow state for at least a certain period of time.

As described above, in a negative flow, an ink which has not passed through the filter can be flowed into the ink jet bar 14. Therefore, as in the above, it is preferable that the ink volume V1 and the ink volume V2 satisfy the relationship of V1>V2. In addition, it is desirable that agitating sequences are executed not only once but a plurality of times. Further, it is preferable that the ink volume speed U1 and the ink volume speed U2 satisfy the relationships of U1>U0 and U2>U0 with respect to the ink volume speed U0 in a case of a normal operation.

In addition, in agitating sequences, an ink flows in the drain flow passage 54 where the ink does not flow in a case of a normal operation. Since there is little opportunity in which the ink flows in the case of the normal operation, the drain flow passage 54 is in a state where sedimentation of pigments is easy, and the sedimentation of the pigments can be prevented by the agitating sequences.

Herein, it is desirable to replace the ink in the drain flow passage 54 that connects the collection-side back pressure tank 48 and the buffer tank 12 to each other with a fresh ink which has passed through the supply-side filter 26 before executing agitating sequences. For this reason, it is desirable that the positive flow shown in FIG. 11 is executed for a predetermined time.

In addition, in a case where the volume of the drain flow passage 54 that connects the collection-side back pressure tank 48 and the buffer tank 12 to each other is V4, it is desirable that the ink volume V2 of a negative flow is smaller than the volume V4 of the drain flow passage 54. Accordingly, a probability in which an ink which has not passed through the collection-side filter 90 flows in an inappropriate region can be lowered.

It is desirable to execute the sequences for all tubes configuring a flow passage except for a tube for discarding an ink (not shown), other than a flow passage near the ink jet bar 14. Alternatively, it is desirable to execute the sequences for all tubes configuring a flow passage other than a flow passage near the ink jet bar 14 on an upstream side from the buffer tank 12. By doing so, the ink supply device 10 can be stably operated without sedimentation of pigments and foreign substances in an ink even in a tube that is not being used.

Although an example in which a filter between the buffer tank 12 and the ink jet bar 14 in a negative flow of each of the agitating flow passages 99A, 99B, and 99C is not disposed has been described hereinbefore, the filter may be disposed. In this case, foreign substances accumulate on an ink jet bar 14 side of the filter in a case of a normal operation. Then, in a case where a negative flow is generated in the filter in a case of a maintenance operation, foreign substances are peeled off from the filter and flow to the ink jet bar 14 side. Therefore, there is the same problem in that the contaminated ink flows to the ink jet bar 14 side in the negative flow regardless of the presence or absence of disposition of the filter between the buffer tank 12 and the ink jet bar 14 in the negative flow.

Fourth Embodiment

Figure 13:
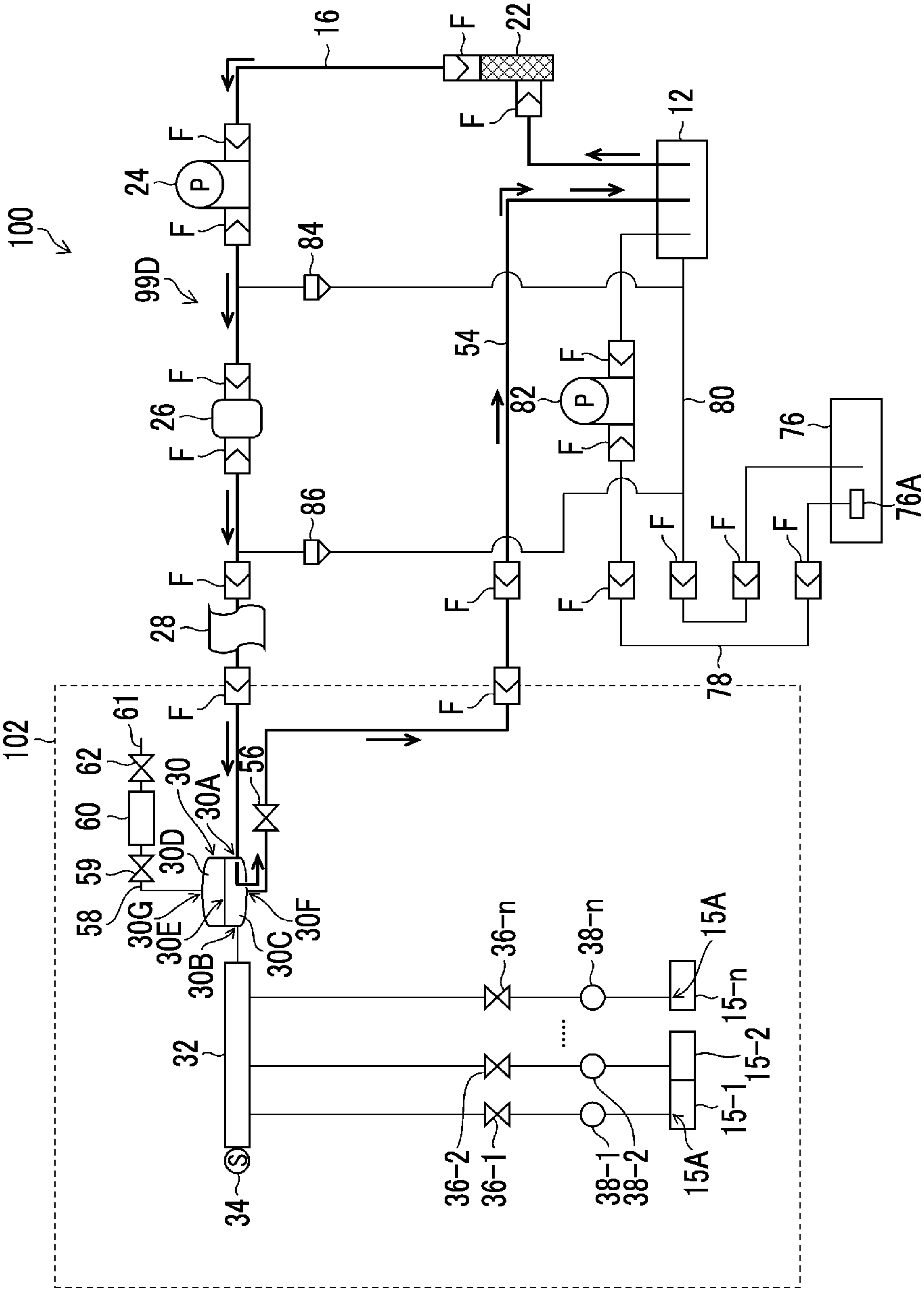
FIG. 13 is a diagram showing a flow of an ink in a maintenance operation according to a fourth embodiment of the ink supply device.
Figure 14:
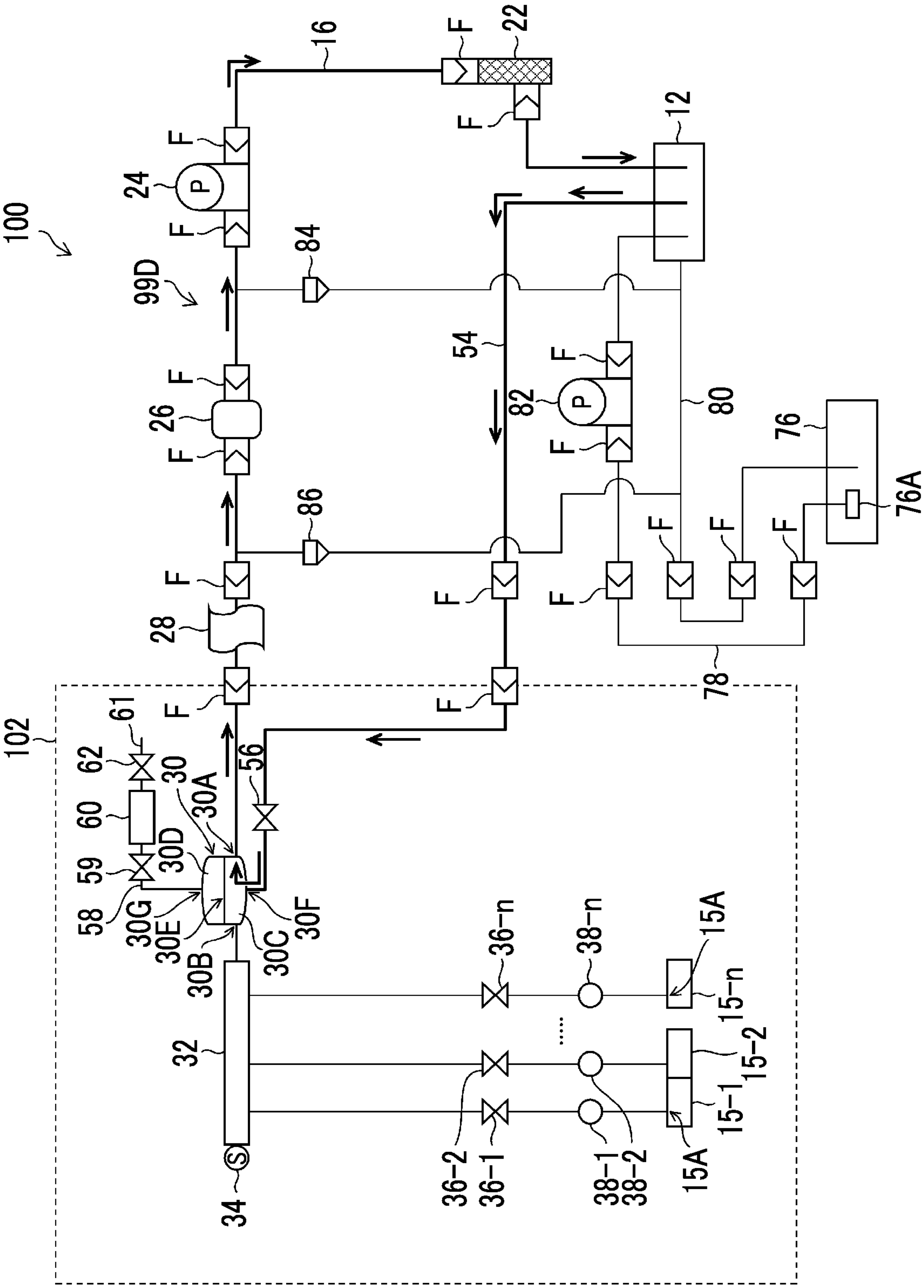
FIG. 14 is a diagram showing a flow of the ink in the maintenance operation according to the fourth embodiment of the ink supply device.

FIGS. 13 and 14 are diagrams showing an overall configuration and a flow of an ink in a maintenance operation of an ink supply device 100 (an example of a liquid supply device). Portions common to the ink supply device 10 shown in FIG. 1 will be assigned with the same reference numerals, and detailed thereof will be omitted.

An ink jet bar 102 has an ink flow passage configuration where an ink does not circulate to the head modules 15. That is, the head module 15 comprises the ink supply port 15A and does not comprise the ink discharge port 15B. An ink supplied to the supply-side head manifold 32 is supplied to the head modules 15 via the supply valves 36 and the supply dampers 38.

At least in a maintenance operation, the ink supply device 100 executes agitating sequences including first processing of generating a positive flow in an ink in an agitating flow passage 99D (an example of the first flow passage) and second processing of generating a negative flow in the ink in the agitating flow passage 99D.

As shown in FIGS. 13 and 14, the agitating flow passage 99D is a flow passage that connects the buffer tank 12, the degassing module 22, the supply pump 24, the supply-side filter 26, the heat exchanger 28, the supply-side back pressure tank 30, the drain valve 56, and the buffer tank 12 to each other. That is, the valve control unit 97 brings the drain valve 56 into an open state in a case of a maintenance operation.

As shown by arrows in FIG. 13, a positive flow of first processing is a flow in which an ink in the buffer tank 12 returns to the buffer tank 12 via the degassing module 22, the supply pump 24, the supply-side filter 26, the heat exchanger 28, the supply-side back pressure tank 30, and the drain valve 56.

In the agitating flow passage 99D, the supply-side filter 26 is disposed between the buffer tank 12 and the ink jet bar 14 in a positive flow. In the first processing, the pump control unit 98 rotates the supply pump 24 in the positive direction and flows an ink having the ink volume V1 at the ink volume speed U1.

As shown by arrows in FIG. 14, a negative flow of second processing is a flow in which an ink in the buffer tank 12 returns to the buffer tank 12 via the drain valve 56, the supply-side back pressure tank 30, the heat exchanger 28, the supply-side filter 26, the supply pump 24, and the degassing module 22. In the agitating flow passage 99D, a filter is not disposed between the buffer tank 12 and the ink jet bar 14 in the negative flow. In the second processing, the pump control unit 98 rotates the supply pump 24 in the negative direction and flows an ink having the ink volume V2 at the ink volume speed U2. The negative flow has a steady flow state for at least a certain period of time.

As described above, in a negative flow, an ink flows in a steady flow in an opposite direction to a direction in a case of a normal operation, from the supply-side back pressure tank 30 to the buffer tank 12 via the heat exchanger 28, the supply-side filter 26, the supply pump 24, and the degassing module 22, and an ink which has not passed through the supply-side filter 26 can flow into the inside of the ink jet bar 14. Therefore, as in the above, it is preferable that the ink volume V1 and the ink volume V2 satisfy the relationship of V1>V2. In addition, it is desirable that agitating sequences are executed not only once but a plurality of times. Further, it is preferable that the ink volume speed U1 and the ink volume speed U2 satisfy relationships of U1>U0 and U2>U0 with respect to the ink volume speed U0 in a case of the normal operation.

In addition, in agitating sequences, an ink flows in the drain flow passage 54 where the ink does not flow in a case of a normal operation. Since there is little opportunity in which the ink flows in the case of the normal operation, the drain flow passage 54 is in a state where sedimentation of pigments is easy, and the sedimentation of the pigments can be prevented by the agitating sequences. Also in the case of the normal operation, the ink may circulate as shown in FIG. 13.

Herein, it is desirable to replace an ink in the drain flow passage 54 that connects the supply-side back pressure tank 30 and the buffer tank 12 to each other with a fresh ink which has passed through the supply-side filter 26, before executing agitating sequences. For this reason, it is desirable that the positive flow shown in FIG. 13 is executed for a predetermined time.

[Configuration of Ink Jet Printing Apparatus]

Figure 15:
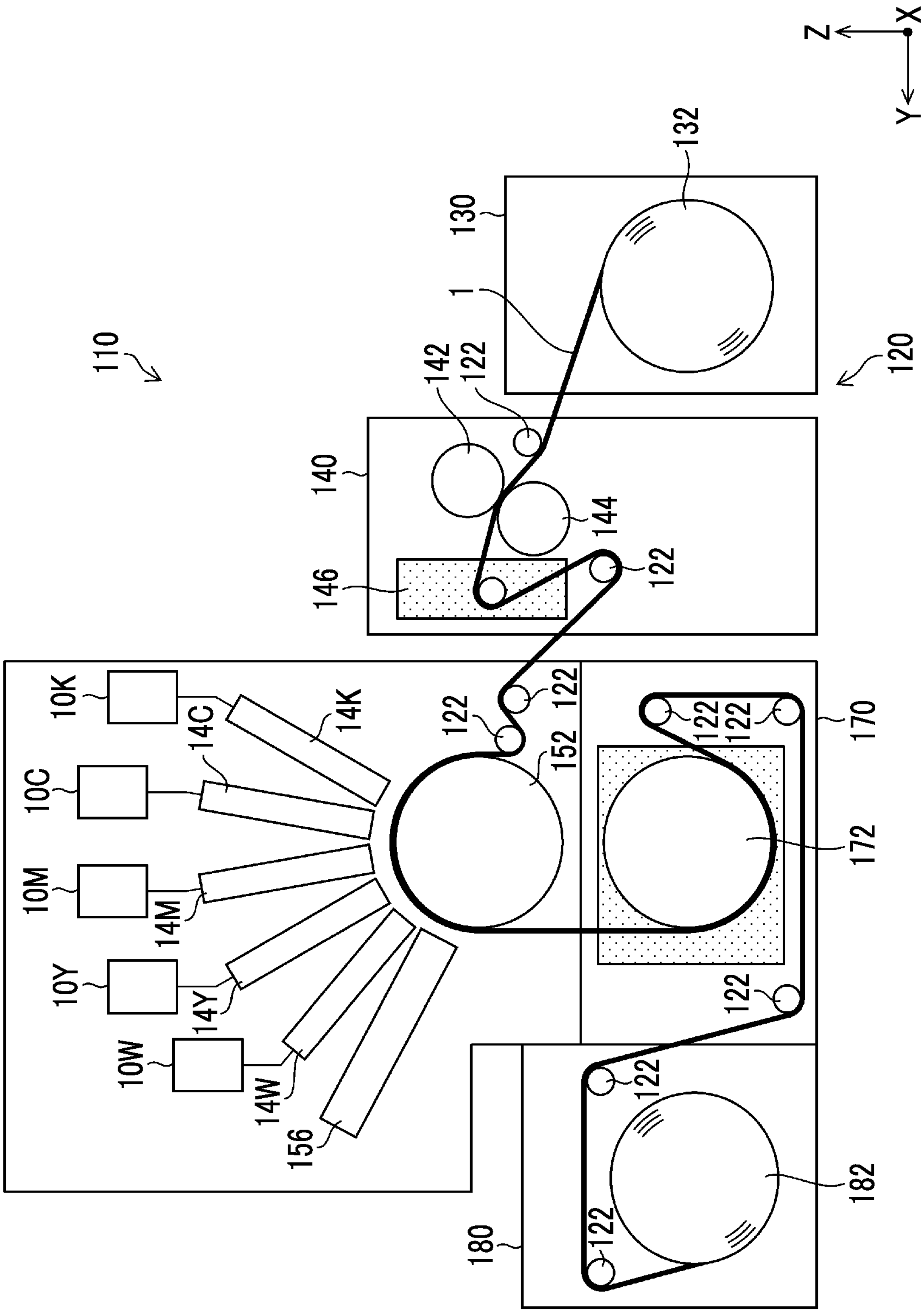
FIG. 15 is an overall configuration diagram of an ink jet printing apparatus to which the ink supply device is applied.

FIG. 15 is an overall configuration diagram of an ink jet printing apparatus 110 to which the ink supply device 10 is applied. The ink jet printing apparatus 110 is a printer that prints an image on web-like paper 1 (an example of a printing substrate) in a single-pass method. General-purpose printing paper is used as the paper 1. The general-purpose printing paper is not a so-called ink jet dedicated paper and refers to paper mainly made of cellulose, such as coated paper used in general offset printing or the like.

As shown in FIG. 15, the ink jet printing apparatus 110 is composed of a transporting unit 120, a feeding unit 130, a pretreatment liquid coating unit 140, a printing unit 150, a drying unit 170, and a winding unit 180.

<Transporting Unit, Feeding Unit, and Winding Unit>

The transporting unit 120 transports the paper 1 along a transport path from the feeding unit 130 to the winding unit

180. The transporting unit 120 comprises a plurality of pass rollers 122 that function as guide rollers.

The feeding unit 130 comprises a feeding roll 132. The feeding roll 132 comprises a reel (not shown) that is rotatably supported. The paper 1 on which an image is yet to be printed is wound around the reel in a roll shape.

On the other hand, the winding unit 180 comprises a winding roll 182. The winding roll 182 comprises a reel (not shown) rotatably supported. One end of the paper 1 is connected to the reel. The winding roll 182 comprises a winding motor (not shown) that rotationally-drives the reel.

The transporting unit 120 transports the paper 1 on the transport path from the feeding roll 132 to the winding roll 182 in a roll-to-roll method. As described above, the transporting unit 120 functions as a moving mechanism that relatively moves the printing unit 150 and the paper 1.

<Pretreatment Liquid Coating Unit>

The pretreatment liquid coating unit 140 is disposed on an upstream side of the printing unit 150 in the transport path. The pretreatment liquid coating unit 140 coats a printing surface of the paper 1 with a pretreatment liquid. The pretreatment liquid is a liquid that contains a component, which coagulates, insolubilizes, or thickens a coloring material component in an aqueous ink, and thickens by reacting with the aqueous ink.

The pretreatment liquid coating unit 140 comprises a coating roller 142, an opposing roller 144, and a pretreatment liquid drying unit 146. The paper 1 transported from the feeding unit 130 is guided by the pass rollers 122 and is transported to a position opposing the coating roller 142.

The coating roller 142 is rotated by a motor (not shown). A pretreatment liquid is supplied from a coater (not shown) to the surface of the coating roller 142, and after then, an excess pretreatment liquid is scraped off by a blade (not shown). The paper 1 is nipped between the coating roller 142 and the opposing roller 144, the surface of the coating roller 142, to which the pretreatment liquid is supplied, touches the printing surface of the paper 1, and the pretreatment liquid supplied to the surface is coated with the printing surface of the paper 1.

A method of coating the printing surface of the paper 1 with a pretreatment liquid is not limited to a method using the coating roller 142 and may be, for example, a method of using a liquid jetting head.

The paper 1 coated with a pretreatment liquid is transported to the pretreatment liquid drying unit 146. The pretreatment liquid drying unit 146 comprises a hot air heater (not shown). The pretreatment liquid drying unit 146 blows hot air from the hot air heater toward the printing surface of the paper 1 and dries the pretreatment liquid.

The paper 1 on which the pretreatment liquid is dried is guided by the pass rollers 122 and is transported to the printing unit 150.

<Printing Unit>

The printing unit 150 prints an image on the printing surface of the paper 1. The printing unit 150 comprises a printing drum 152, ink jet bars 14K, 14C, 14M, 14Y, and 14W, ink supply devices 10K, 10C, 10M, 10Y, and 10W, and a scanner 156.

The paper 1 transported from the pretreatment liquid coating unit 140 is guided by the plurality of pass rollers 122 and is transported to the printing drum 152.

The printing drum 152 is rotated by a motor (not shown) and holds and transports, on an outer peripheral surface thereof, the paper 1. The printing drum 152 has a plurality of adsorption holes (not shown) in the outer peripheral surface. The printing drum 152 adsorbs the paper 1 with the outer peripheral surface by sucking through the adsorption holes with a pump (not shown).

The paper 1 transported by the printing drum 152 is transported to a position opposing the ink jet bars 14K, 14C, 14M, 14Y, and 14W.

The ink jet bar 14 shown in FIG. 1 can be applied to each of the ink jet bars 14K, 14C, 14M, 14Y, and 14W. The ink jet bars 14K, 14C, 14M, 14Y, and 14W jet black (K), cyan (C), magenta (M), yellow (Y), and white (W) aqueous inks, respectively. The aqueous ink refers to an ink obtained by dissolving or dispersing a coloring material such as a dye and a pigment in water and a solvent soluble in water. An aqueous white ink contains a titanium oxide material as a pigment, and an average particle diameter (an example of a diameter of a dispersed particle) of the titanium oxide material exceeds 100 nm. The average particle diameter is a particle diameter at an integrated value of 50% in a particle size distribution acquired through a laser diffraction/scattering method.

Each of the ink jet bars 14K, 14C, 14M, 14Y, and 14W is composed of a line type recording head that can perform printing on the paper 1 transported by the printing drum 152 with one time of scanning. The ink jet bars 14K, 14C, 14M, 14Y, and 14W are configured by connecting the plurality of head modules 15 to each other in an X-direction. A nozzle surface of each of the ink jet bars 14K, 14C, 14M, 14Y, and 14W is disposed to oppose the printing drum 152. The ink jet bars 14K, 14C, 14M, 14Y, and 14W are disposed at regular intervals along the transport path.

The ink supply device 10 shown in FIG. 1 can be applied to each of the ink supply devices 10K, 10C, 10M, 10Y, and 10W. The ink supply devices 10K, 10C, 10M, 10Y, and 10W supply aqueous inks of corresponding colors to the ink jet bars 14K, 14C, 14M, 14Y, and 14W, respectively.

The scanner 156 includes an image pick-up device that picks up an image printed on the printing surface of the paper 1 and that converts into an electrical signal. A color charge coupled device (CCD) linear image sensor can be used as the image pick-up device. Instead of the color CCD linear image sensor, a color complementary metal oxide semiconductor (CMOS) linear image sensor can be used.

In the printing unit 150, aqueous ink droplets are jetted from at least one of the ink jet bars 14K, 14C, 14M, 14Y, and 14W toward the printing surface of the paper 1 transported by the printing drum 152. As the jetted aqueous ink droplets adhere to the paper 1, an image is printed on the printing surface of the paper 1.

In addition, as the printing surface of the paper 1 transported by the printing drum 152 is read by the scanner 156, a reading result is acquired.

<Drying Unit>

The drying unit 170 dries an ink on the printing surface of the paper 1. The drying unit 170 comprises a drying drum 172.

The paper 1 transported from the printing unit 150 is transported to the drying drum 172. The drying drum 172 is rotated by a motor (not shown) and holds and transports, on an outer peripheral surface thereof, the paper 1. The drying drum 172 has a plurality of adsorption holes (not shown) in the outer peripheral surface. The drying drum 172 adsorbs the paper 1 with the outer peripheral surface by sucking through the adsorption holes with a pump (not shown).

The drying unit 170 comprises a hot air heater (not shown) around the drying drum 172. The drying unit 170 blows hot air from the hot air heater toward the printing surface of the paper 1 and dries an ink.

<Configuration of Head Module>

Figure 16:
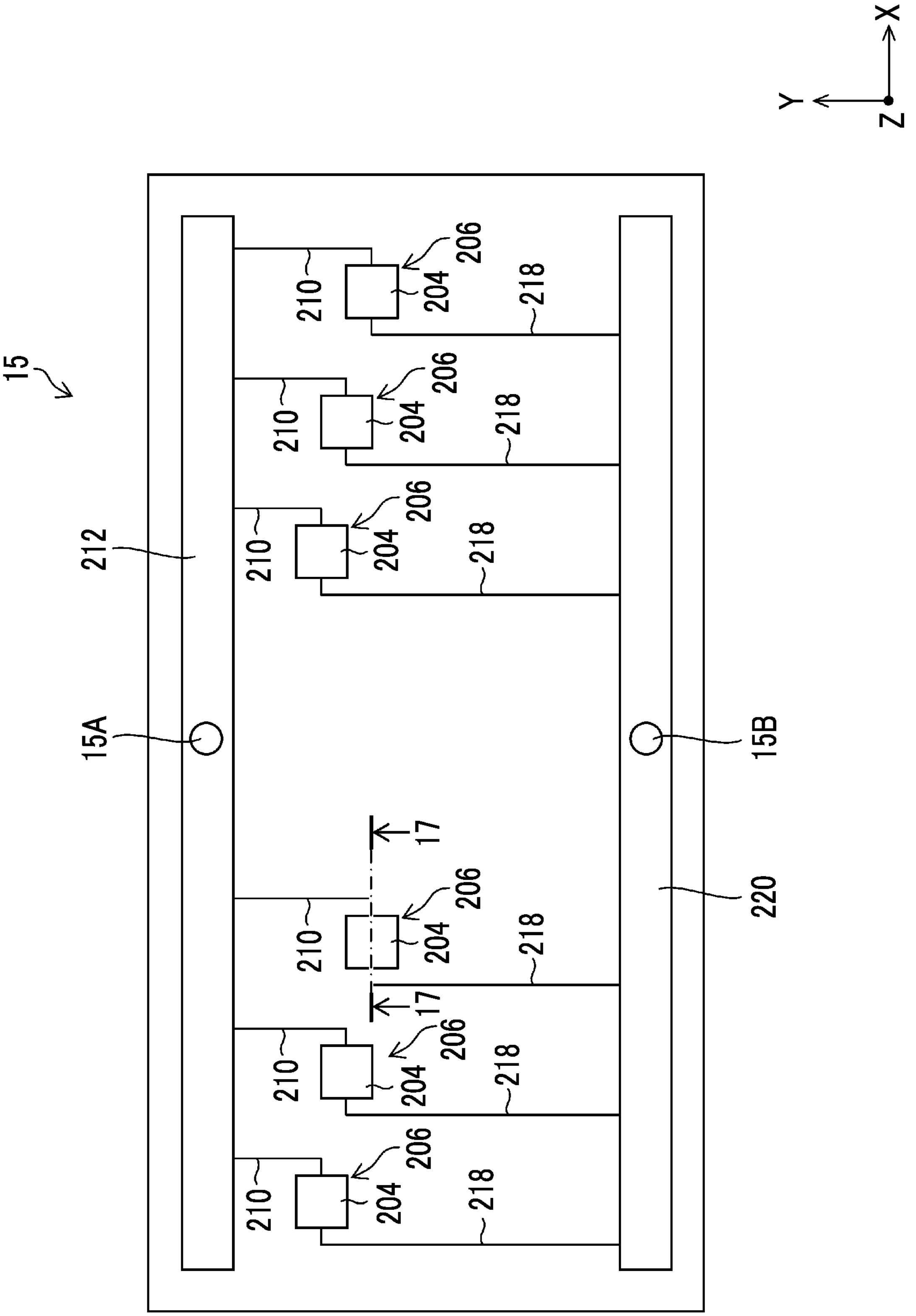
FIG. 16 is a perspective plan view showing a structural example of a head module.
Figure 17:
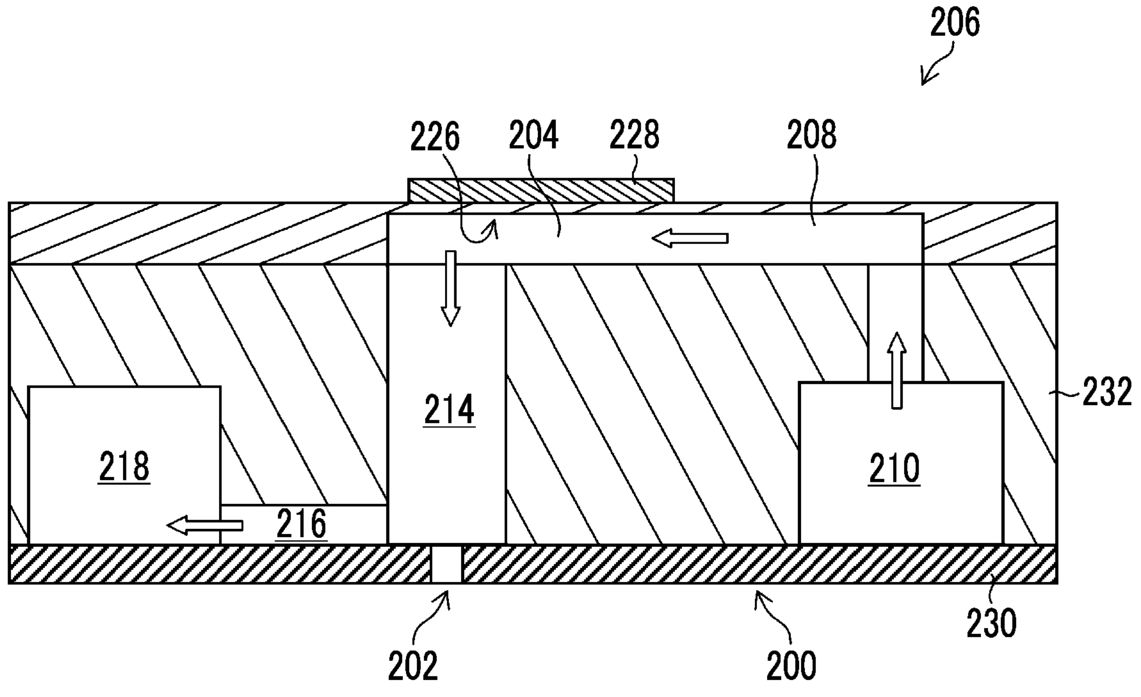
FIG. 17 is a cross-sectional view taken along line 17-17 of FIG. 16.

Each of the ink jet bars 14K, 14C, 14M, 14Y, and 14W has a structure where the head module 15 are connected to each other in the X-direction. FIG. 16 is a perspective plan view showing a structural example of the head module 15, and FIG. 17 is a cross-sectional view taken along line 17-17 of FIG. 16.

The head module 15 includes a nozzle plate 230 in which the nozzle 202, which is an outlet of ink droplets, is formed and a flow passage plate 232 in which an ink flow passage is formed. The nozzle plate 230 and the flow passage plate 232 are laminated and joined. The flow passage plate 232 has a structure where one or a plurality of plates of substrates are laminated. The nozzle plate 230 and the flow passage plate 232 can be processed into a required shape through a semiconductor manufacturing process with silicon as a material.

The head module 15 comprises the plurality of nozzles 202 in a nozzle surface 200, which is a bottom surface. In addition, each of a plurality of ink chamber units 206, which consists of a pressure chamber 204 or the like provided to correspond to each nozzle 202, is two-dimensionally disposed in a regular arrangement pattern. Accordingly, a substantially high density of nozzle intervals that are projected to be aligned along the X-direction is achieved.

The pressure chamber 204 communicates with a supply tributary 210 via a supply throttle 208, and each supply tributary 210 communicates with a common flow passage 212. In addition, a descender 214 that communicates with each pressure chamber 204 communicates with a circulation common flow passage 220 via an ink circulation path 216 and a collection tributary 218. The head module 15 is provided with the ink supply port 15A and the ink discharge port 15B, the ink supply port 15A communicates with the common flow passage 212, and the ink discharge port 15B communicates with the circulation common flow passage 220.

As described above, the ink supply port 15A and the ink discharge port 15B of the head module 15 are configured to communicate with each other via the common flow passage 212, the supply tributary 210, the supply throttle 208, the pressure chamber 204, the descender 214, the ink circulation path 216, the collection tributary 218, and the circulation common flow passage 220.

Therefore, an ink supplied to the ink supply port 15A flows in the common flow passage 212, the supply tributary 210, the supply throttle 208, the pressure chamber 204, and the descender 214, some of the ink is jetted from each of the nozzles 202, the remaining ink is discharged from the ink discharge port 15B via the ink circulation path 216, the collection tributary 218, and the circulation common flow passage 220.

It is preferable that the ink circulation path 216 is configured to be provided near the nozzle 202. Herein, the ink circulation path 216 is provided in a region communicating with the descender 214, that is, the region of the flow passage plate 232, which is in contact with the nozzle plate 230. Accordingly, since an ink circulates in the vicinity of the nozzle 202, the ink in the nozzle 202 is prevented from being thickened, and stable jetting becomes possible.

In addition, an actuator 228 that comprises an individual electrode (not shown) is joined to a vibration plate 226 that configures a top surface of the pressure chamber 204 and that serves as a common electrode. In a case where a predetermined voltage is applied to the individual electrode, the actuator 228 deforms in a direction in which the pressure chamber 204 is contracted. Accordingly, an ink is jetted from the nozzle 202. After then, the actuator 228 deforms in a direction in which the pressure chamber 204 is expanded. Accordingly, a new ink is supplied from the common flow passage 212 to the pressure chamber 204 through the supply tributary 210 and the supply throttle 208.

Herein, although the actuator 228 is applied as a jetting force generating unit that jets an ink from the nozzle 202, it is also possible to apply a thermal method in which a heater is included in the pressure chamber 204 and the ink is jetted using a film boiling pressure caused by heating of the heater.

A disposition structure of the nozzle 202 is not limited to the shown example, and various nozzle disposition structures, such as a disposition structure having one nozzle row in the X-direction, can be applied.

[Control System of Ink Jet Printing Apparatus]

Figure 18:
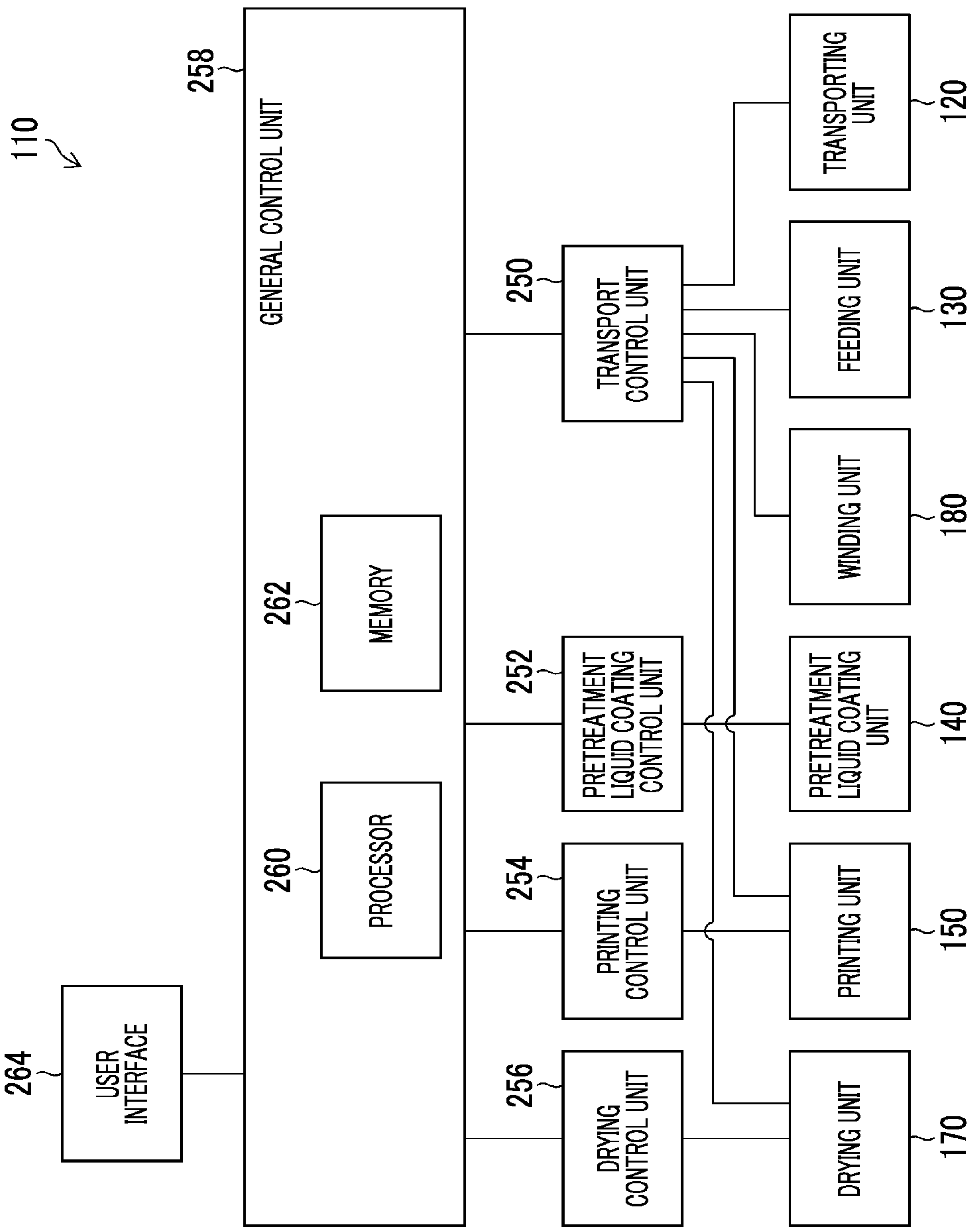
FIG. 18 is a block diagram showing a configuration of a control system of the ink jet printing apparatus.

FIG. 18 is a block diagram showing a configuration of a control system of the ink jet printing apparatus 110. The ink jet printing apparatus 110 comprises a transport control unit 250, a pretreatment liquid coating control unit 252, a printing control unit 254, a drying control unit 256, a general control unit 258, and a user interface 264.

As the transport control unit 250 rotationally-drives the winding roll 182 with a motor (not shown), the paper 1 is unwound from the feeding roll 132. The transporting unit 120 guides the paper 1 with the plurality of pass rollers 122, and the winding unit 180 winds the printed paper 1 around the winding roll 182. Accordingly, the paper 1 is transported through the feeding unit 130, the pretreatment liquid coating unit 140, the printing unit 150, the drying unit 170, and the winding unit 180.

The transport control unit 250 controls a pump (not shown) so that the paper 1 is adsorbed to the outer peripheral surface of the printing drum 152. The transport control unit 250 rotates the printing drum 152 with a motor (not shown). In addition, the transport control unit 250 acquires a rotary encoder value from a rotary encoder (not shown) disposed at the printing drum 152.

The transport control unit 250 controls the pump (not shown) so that the paper 1 is adsorbed to the outer peripheral surface of the drying drum 172. The transport control unit 250 rotates the drying drum 172 with a motor (not shown).

The pretreatment liquid coating control unit 252 causes the coating roller 142 to coat the printing surface of the paper 1 with a pretreatment liquid. In addition, the pretreatment liquid coating control unit 252 causes the hot air heater (not shown) of the pretreatment liquid drying unit 146 to dry the pretreatment liquid which coats the printing surface of the paper 1.

The printing control unit 254 includes the valve control unit 97 and the pump control unit 98 and performs general control of an operation of the ink supply device 10.

The printing control unit 254 controls jetting of inks by the ink jet bars 14K, 14C, 14M, 14Y, and 14W based on printing data. The printing control unit 254 synchronizes a rotary encoder value acquired via the transport control unit 250 and causes the ink jet bars 14K, 14C, 14M, 14Y, and 14W to jet black, cyan, magenta, yellow, and white ink droplets, respectively, toward the paper 1. Accordingly, a color image is printed on the printing surface of the paper 1, and the paper 1 becomes a "printed material".

The general control unit 258 causes the ink supply device 10 to perform a normal operation during printing in which an image is printed on the paper 1 by the ink jet bars 14K, 14C, 14M, 14Y, and 14W and causes the ink supply device 10 to perform a maintenance operation during non-printing other than during printing.

In addition, it is desirable that the general control unit 258 executes agitating sequences of the ink supply devices 10K, 10C, 10M, 10Y, and 10W in a start-up process in a case of starting of the ink jet printing apparatus 110. In addition, it is desirable that the general control unit 258 executes the agitating sequences of the ink supply devices 10K, 10C, 10M, 10Y, and 10W periodically, for example, every three hours, after power supply shutoff of the ink jet printing apparatus 110.

Herein, although the ink supply device 10 is applied for each of black, cyan, magenta, yellow, and white aqueous inks, in particular, it is important to apply the ink supply device 10 for an aqueous white ink. The aqueous white ink contains a titanium oxide material having an average particle diameter of larger than 100 nm, and sedimentation of the titanium oxide material is likely to occur. Therefore, by applying the ink supply device 10 for the aqueous white ink, sedimentation of the contaminated aqueous white ink can be effectively prevented without adversely affecting jetting.

In addition, the printing control unit 254 synchronizes a rotary encoder value acquired via the transport control unit 250, reads an image printed on the paper 1 with the scanner 156, and acquires a reading result.

The ink jet printing apparatus 110 may acquire information of a location of the nozzle 202 having a jetting defect by forming a detection pattern with the printing control unit 254 and analyzing a reading result read with the scanner 156. The printing control unit 254 may output the information of the location of the nozzle 202 having a jetting defect to the general control unit 258.

In addition, the printing control unit 254 may have a compensation function of correcting printing data to compensate for a print region of the nozzle 202 having a jetting defect. For example, there is a compensation function of compensating for the nozzle 202 having a jetting defect by increasing the volume of ink droplets of the plurality of adjacent nozzles 202. The printing control unit 254 outputs information of a location of the printed material, which is compensated through the compensation function, to the general control unit 258.

The drying control unit 256 controls heating by the hot air heater (not shown) to dry the paper 1 with the drying unit 170.

The general control unit 258 controls each of the transport control unit 250, the pretreatment liquid coating control unit 252, the printing control unit 254, and the drying control unit 256 to perform general control of an operation of the ink jet printing apparatus 110. The general control unit 258 comprises a processor 260 and a memory 262. The general control unit 258 includes the general control unit 94 (see FIG. 2). The processor 260 may be the processor 95. The memory 262 may be the memory 96.

The user interface 264 comprises an input unit (not shown) for a user to operate the ink jet printing apparatus 110 and a display unit (not shown) for the user to present information. The input unit is, for example, an operation panel that receives an input from the user. The display unit is, for example, a display that displays image data and various types of information. The user can cause the ink jet printing apparatus 110 to print a desired image by using the user interface 264.

Herein, although an example in which the ink supply device 10 is applied as each of the ink supply devices 10K, 10C, 10M, 10Y, and 10W has been described, in a case where the ink jet bars 14K, 14C, 14M, 14Y, and 14W have an ink flow passage configuration where an ink does not circulate to the head modules 15, the ink supply device 100 may be applied to each of the ink supply devices 10K, 10C, 10M, 10Y, and 10W.

[Others]

The technical scope of the present invention is not limited to the scope described in the embodiments. The configuration and the like in each embodiment can be combined between the embodiments as appropriate without departing from the gist of the present invention.

EXPLANATION OF REFERENCES

1: paper
10, 10C, 10K, 10M, 10W, 10Y: ink supply device
12: buffer tank
14, 14C, 14K, 14M, 14W, 14Y: ink jet bar
15 (15-1 to **15-*n***): head module
15A: ink supply port
15B: ink discharge port
16: supply flow passage
18: collection flow passage
20: circulation flow passage
22: degassing module
24: supply pump
26: supply-side filter
28: heat exchanger
30: supply-side back pressure tank
30A: ink inflow port
30B: ink outflow port
30C: liquid chamber
30D: gas chamber
30E: elastic film
30F: air bubble discharge port
30G: air flow passage communication port
32: supply-side head manifold
34: supply-side pressure sensor
36: supply valve
36 (36-1 to **36-*n***): supply valve
38 (38-1 to **38-*n***): supply damper
40 (40-1 to **40-*n***): collection damper
42 (42-1 to **42-*n***): collection valve
44: collection-side head manifold
46: collection-side pressure sensor
48: collection-side back pressure tank
48A: ink inflow port
48B: ink outflow port
48C: liquid chamber
48D: gas chamber
48E: elastic film
48F: air bubble discharge port
48G: air flow passage communication port
50: collection pump
52: collection flow passage valve
54: drain flow passage
56: drain valve
58: air flow passage
59: air connect valve
60: air tank
61: atmospheric communication path
62: air valve
64: first bypass flow passage
66: second bypass flow passage
68: first bypass flow passage valve
69: second bypass flow passage valve
70: drain valve
71: air flow passage
72: air connect valve

73: air tank
74: atmospheric communication path
75: air valve
76: ink main tank
76A: main tank filter
78: replenishment flow passage
80: overflow flow passage
82: replenishment pump
84: first safety valve
86: second safety valve
88: third safety valve
90: collection-side filter
92: collection-side filter valve
94: general control unit
95: processor
96: memory
97: valve control unit
98: pump control unit
99A: agitating flow passage
99B: agitating flow passage
99C: agitating flow passage
99D: agitating flow passage
102: ink jet bar
110: ink jet printing apparatus
120: transporting unit
122: pass roller
130: feeding unit
132: feeding roll
140: pretreatment liquid coating unit
142: coating roller
144: opposing roller
146: pretreatment liquid drying unit
150: printing unit
152: printing drum
156: scanner
170: drying unit
172: drying drum
180: winding unit
182: winding roll
200: nozzle surface
202: nozzle
204: pressure chamber
206: ink chamber unit
210: supply tributary
212: common flow passage
214: descender
216: ink circulation path
218: collection tributary
220: circulation common flow passage
226: vibration plate
228: actuator
230: nozzle plate
232: flow passage plate
250: transport control unit
252: pretreatment liquid coating control unit
254: printing control unit
256: drying control unit
258: general control unit
260: processor
262: memory
264: user interface
F: splice
S1 to S5: each step of control method of ink supply device

What is claimed is:

1. A liquid supply device comprising:

a circulation flow passage through which a liquid is supplied from a liquid tank storing the liquid to a liquid jetting head and the liquid is collected from the liquid jetting head to the liquid tank;

a pump that is provided at the circulation flow passage and that generates a flow in the liquid in the circulation flow passage;

a memory that stores a command which is executed by a processor; and the processor that executes the command stored in the memory, wherein the processor is configured to execute, by controlling the pump, a sequence that includes first processing of generating a positive flow in a first direction in the liquid in a first flow passage including at least a part of the circulation flow passage and second processing of generating a negative flow in an opposite direction to the first direction in the liquid in the first flow passage, in the first flow passage, a filter that removes a foreign substance in the liquid is disposed between the liquid tank and the liquid jetting head in the positive flow, a flow rate of the liquid of the positive flow is higher than a flow rate of the liquid of the negative flow, and the negative flow has a steady flow state.

2. The liquid supply device according to claim 1, wherein in the first flow passage, the filter that removes the foreign substance in the liquid is not disposed between the liquid tank and the liquid jetting head in the negative flow.

3. The liquid supply device according to claim 1, wherein the processor is configured to execute the sequence a plurality of times.

4. The liquid supply device according to claim 1, wherein the first flow passage includes a second flow passage different from the circulation flow passage.

5. The liquid supply device according to claim 4, wherein the flow rate of the liquid of the negative flow is lower than a volume of the second flow passage.

6. The liquid supply device according to claim 4, wherein the processor is configured to replace the liquid in the second flow passage with the liquid from which the foreign substance is removed by the filter by controlling the pump before executing the sequence.

7. The liquid supply device according to claim 4, wherein the processor is configured to replace the liquid in all flow passages of the first flow passage, in which the liquid of the negative flow has flowed, with the liquid from which the foreign substance is removed by the filter by controlling the pump after executing the sequence.

8. A printing apparatus comprising:

a liquid tank that stores a liquid;

a liquid jetting head that jets the liquid from an outlet;

a moving mechanism that relatively moves the liquid jetting head and a printing substrate; and the liquid supply device according to claim 1, wherein the processor is configured to:

print an image on the printing substrate by jetting the liquid from the outlet of the liquid jetting head while relatively moving the liquid jetting head and the printing substrate;

circulate the liquid in the circulation flow passage during the printing; and execute the sequence during non-printing other than during the printing.

9. The printing apparatus according to claim 8, wherein a volume speed of the positive flow is at least temporarily higher than a volume speed during the printing.

10. The printing apparatus according to claim 8, wherein a volume speed of the negative flow is at least temporarily higher than a volume speed during the printing.

11. The printing apparatus according to claim 8, wherein a diameter of a particle dispersed in the liquid exceeds 100 nm.

12. The printing apparatus according to claim 8, wherein the liquid is a white ink that contains a titanium oxide material.

13. The printing apparatus according to claim 8, wherein the circulation flow passage comprises a valve that opens and closes some of flow passages of the circulation flow passage, and the processor is configured to control the valve to determine the first flow passage.

14. A control method of a liquid supply device including a circulation flow passage through which a liquid is supplied from a liquid tank storing the liquid to a liquid jetting head and the liquid is collected from the liquid jetting head to the liquid tank and a pump that is provided at the circulation flow passage and that generates a flow in the liquid in the circulation flow passage, the control method comprising:

executing, by controlling the pump, a sequence that includes first processing of generating a positive flow in a first direction in the liquid in the first flow passage including at least a part of the circulation flow passage and second processing of generating a negative flow in an opposite direction to the first direction in the liquid in the first flow passage, wherein the positive flow in the first direction moves the liquid from the liquid tank to the liquid jetting head, and the negative flow in the opposite direction moves the liquid from the liquid jetting head to the liquid tank, wherein in the first flow passage, a filter that removes a foreign substance in the liquid is disposed between the liquid tank and the liquid jetting head in the positive flow, a flow rate of the liquid of the positive flow is higher than a flow rate of the liquid of the negative flow, and the negative flow has a steady flow state.

* * * * *